US006792418B1

(12) United States Patent
Binnig et al.

(10) Patent No.: US 6,792,418 B1
(45) Date of Patent: Sep. 14, 2004

(54) FILE OR DATABASE MANAGER SYSTEMS BASED ON A FRACTAL HIERARCHICAL INDEX STRUCTURE

(75) Inventors: Gerd K. Binnig, Wollerau (CH); Peter Bloechl, Adliswil (CH); Juergen Klenk, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/537,780

(22) Filed: Mar. 29, 2000

(51) Int. Cl.[7] ............................................. G06F 17/30
(52) U.S. Cl. .............................. 707/3; 707/2; 707/100; 706/20; 706/15; 704/1
(58) Field of Search .............................. 707/2, 3, 100, 707/200, 252, 526; 706/20, 15; 704/1

(56) References Cited

U.S. PATENT DOCUMENTS

| | | | | |
|---|---|---|---|---|
| 5,355,497 A | | 10/1994 | Cohen-Levy | ............... 707/200 |
| 6,182,024 B1 | * | 1/2001 | Gangopadhyay et al. | ..... 703/22 |
| 2002/0013705 A1 | * | 1/2002 | Jaepel et al. | ................ 704/252 |

FOREIGN PATENT DOCUMENTS

| | | |
|---|---|---|
| EP | 0 638 870 | 3/1986 |
| EP | 638870 A1 | 2/1995 |
| GB | 2 302 420 | 6/1995 |
| GB | 2302420 A | 1/1997 |
| JP | 60-181841 | 9/1985 |
| JP | 01-140332 | 6/1989 |
| JP | 01-180046 | 7/1989 |
| JP | 04-160435 | 6/1992 |
| JP | 06-176081 | 6/1994 |
| JP | 07-006077 | 1/1995 |
| JP | 07-044753 | 2/1995 |
| JP | 09-190453 | 7/1997 |
| JP | 09-305613 | 11/1997 |
| JP | 11-066077 | 3/1999 |
| JP | 9-305613 | 9/1999 |
| JP | 11-66077 | 11/1999 |

OTHER PUBLICATIONS

European Search Report, EP 99 10 6569, Sep. 9, 1999.
Int. J. Man–Machine Studies, (1989), vol. 31, pp. 121–147, C. F. McMath et al., "A Graphical Thesaurus–Based Information Retrieval System".
McMath et al., "A Graphical Thesaurus–Based Information Retrieval System", XP–002066787, International Journal of Man—Machine Studies, pp. 121–147, Aug. 1, 1989.
ICE Technical Report: "A Method for Automatic Acquisition fo a Network Typed Task Model Using word Sequences of Dialogue", vol. 98, No. 274, 1999.
Itsul Kiuchi et al. "Concept Browser for a Knowledge–Based Retrieval System", vol. 89, No. 47, 1989, 89–F1–13.
Sakurai et al. "*Method for Automatic Acquisition of a Network Type Task Model Using Word Sequences of Dialogue*", ICE Technical Report, vol. 98, No. 274 (In Japanese with English Abstract–Previously submitted on May 13, 2002).

* cited by examiner

*Primary Examiner*—Charles Rones
(74) *Attorney, Agent, or Firm*—Ohlandt, Greeley, Ruggiero & Perle, L.L.P.; Ingrid M. Foerster

(57) ABSTRACT

Database system (10) which comprises a fractal hierarchical index database (13), and a processing unit (19). The processing unit (19) is employed to evaluate an input string (12) describing an element (E1) that is to be added to the database system (10) in order to obtain an input network (18) comprising a semantical unit (SU1) representing the element (E1). Then the processing unit (19) updates the index database (13). Finally, either an existing access pointer (22) is maintained, or a new access pointer (22) is created between the element (E1) and the semantical unit (SU1) representing the element (E1) thereby rendering the element (E1) in the database system (10) accessible or retrievable.

47 Claims, 14 Drawing Sheets

```
----------------- English Slot Grammar -----------------

Input sentence:
Mike was a young boy.

Lexical processing time = 220.0 msec.
Syntactic analysis time = 40.0 msec.
Number of parses = 1.

Syntactic analysis no. 1    Evaluation = 0.220000...

/--- subj(n)  Mike1(1)    noun propn sg
o--- top      be(2,1,5)   verb vfin vpast sg vsubj
 /-  ndet     a(3)        det sg indef
 /-  nadj     young1(4)   adj
 \-+ pred(n)  boy1(5)     noun cn sg Input sentence:
He walked to school every morning.

Lexical processing time = 0.0 msec.
Syntactic analysis time = 0.0 msec.
Number of parses = 1.

Syntactic analysis no. 1    Evaluation = -0.680000...

/--- subj(n)      he(1)        noun pron def nom sg
o--- top          walk1(2,1,u,3) verb vfin vpast sg vsubj
\-+  comp(lo)     to2(3,4)     prep
  \- objprep(n)   school1(4)   noun cn sg
  /-  ndet        every1(5)    det sg indef
  \-+ vadv        morning1(6,u) noun cn sg tm
```

Fig. 3A

FILE OR DATABASE MANAGER SYSTEMS BASED ON A FRACTAL HIERARCHICAL INDEX STRUCTURE

FIELD OF THE INVENTION

The invention concerns a file or database manager and systems based thereon.

BACKGROUND OF THE INVENTION

In their attempts at automated apprehension of the meaning of speech and text, neither linguists nor computer scientists have made much progress. They have concentrated too much on the logical structure of the texts themselves and have neglected the structure of the world. Speech and textual information are obviously based on the structure of the world and refer to it.

Quite some progress has been made in phonological and/or phonetical, lexical, morphological, and syntactical analyses of natural language processing. However, when it comes to understanding the meaning of speech, i.e. the semantical interpretation of speech, the breakthrough has not yet been achieved. As a consequence, the pragmatical analysis, the control of tools and devices by natural speech or text, has also not been developed very far.

A typical example of a modern speech/text recognition system is described in the article "Enabling agents to work together", by R. V. Guha et al., Communications of the ACM, Vol. 37, No. 7, July 1994, pp. 127–142, and reviewed by T. J. Schult in the German article "Transparente Trivialitäten; Cyc-Wissensbasis in WWW", c't 1996, Vol. 10, pp. 118–121. The Cyc-system described by R. V. Guha is a knowledge based system for true/false categorization of input statements. T. J. Schult points out in his article that the knowledge representation in the database used in the Cyc-system is not standardized and uses only the following relations for deduction: 'is element of', 'is subset of', and 'has subsets'.

The interaction between human beings and machines, such as computer systems, are the subject of extensive research activities. Ease of use is a is a key aspect of such research activities.

A typical computer system comprises a central processing unit, memory, peripheral devices such as data input/output devices and storage media such as floppy disks or hard disks. The devices communicate with each other via a computer operating system. Computer operating systems include several different operational modules. One such module might be a file manager. Client data stored on a storage medium is organized as a file system having an associated format, and the file manager is employed to control the access to the file systems. The file manager provides file system access to clients using various software via Application Programmer Interfaces (APIs) adapted to the software. For example, the file manager may include an Apple Computer, Inc. API to interface with Apple software or an MS-DOS INT 21 API (Microsoft Disk Operating System) to interface with DOS software.

The file system stores, organizes and describes client data. The client data is stored in files. The files are arranged in each file system in a particular format. Each file system maintains its organization and description information, referred to as metadata, in format specific structures. Examples of such formats are HFS, MS-DOS FAT, ProDOS, High Sierra, ISO 9660, NTFS, and so on. The term format encompasses both physical disk format and network server access protocols.

To read and write data from and to the file system, the file manager must be able to recognize the format of the file system.

A typical example of a file system and file manager is addressed in U.S. Pat. No. 5,355,497. This patent concerns a directory structure that represents the 'real world'. The 'real world' is structure in the form of a tree and the items of the 'real world' structure are physical items such as file cabinets, folders, etc. It appears that the structure of this 'real world' has a one-to-one correspondence with an underlying file structure. According to this U.S. Patent information about a file is entered manually by the user into a predefined collection of fields. This is done at the time when the respective file is saved to disk. The user must provide the file location. It is a disadvantage of this and similar systems and schemes that keywords and other identifiers have to be generated by a user and are thus unpredictable. These kind of systems and schemes only work well if the user is able to remember previously used keywords, otherwise file retrieval is a difficult and time consuming. The system according to U.S. Pat. No. 5,355,497 does not address an automatic categorization of files. Ease of use-is also an important-aspect in designing database products.

It is a well know disadvantage of known file and database systems that as the amount of files or database entries increases the handling becomes more and more cumbersome. Easy access or retrieval, simple and fast storing files or recording entries, and a clear overview of the whole file or database system are crucial.

It is an objective of the present invention to provide a scheme for adding elements to a database system.

It is an objective of the present invention to provide a scheme for acting upon elements in a database system.

It is an objective of the present invention to provide a new structure for the representation of knowledge in a database system that allows for ease of handling elements in the database, e.g. when adding an element or when discovering/retrieving an element It is another objective of the present invention to provide a system or scheme for effective searching and discovery of elements in a database (e.g. files in a directory).

SUMMARY OF THE INVENTION

The objectives of the present invention have been accomplished by the methods, computer program products, computer program elements, and database systems as claimed.

Advantages of the present invention are addressed in connection with the detailed description or are apparent from the description.

DESCRIPTION OF THE DRAWINGS

The invention is described in detail below with reference to the following schematic drawings.

FIGS. 3A and 3B illustrate how an input string (query) can be transformed into an input network, in accordance with an embodiment of the present invention.

Figure 1:
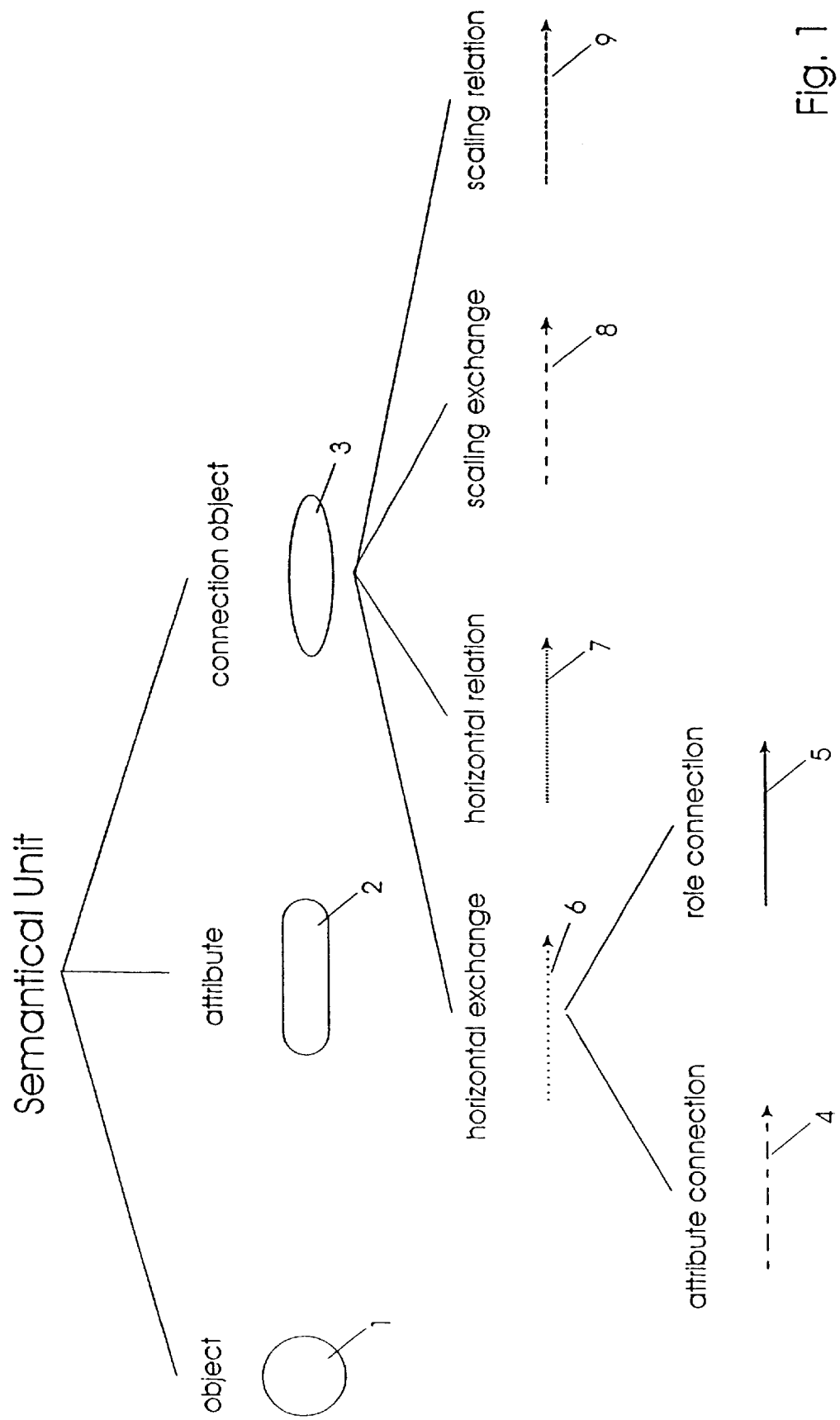
FIG. 1 shows the elements (semantical units) of a fractal hierarchical knowledge database (e.g. a knowledge database or an index database), in accordance with the present invention Note that connection objects are special semantical units, so they can be pointed at from other semantical units via other connection objects.

DESCRIPTION OF PREFERRED EMBODIMENTS:

In the following, the basic concept of the present invention is described. Before addressing different aspects and embodiments, the relevant terms and expressions are defined and explained.

The words "interpretation" and "apprehension" are herein used to describe a process which starts with an input string, e.g. some sentences, keywords, and/or questions, and analyzes the textual information (also referred to as original information) conveyed by, or carried in this string and creates an appropriate output, such as a map with a representation of files, or database elements, or an action/reaction, such as the retrieval of a file or a database element.

The expression "element" is herein used to describe an element of a database. Examples of elements are: files (e.g., computer or machine readable files), information kept in a cell of a database, a database record, an image from an image repository, a multimedia object (e.g., an avi or mpeg movie). An element can also be one database of a database of databases.

The word "database" is herein used to describe any collection, library, or repository of information, such as a file database, a database product (e.g., an address database), an image repository. For the purposes of the present invention it does not matter whether the database is structured or unstructured. An example of a structured database is a DOS or Windows file directory (Windows is a trademark of Microsoft Corporation). A typical example of an unstructured database is a Lotus Notes E-mail database which is basically a long string of text (Lotus Notes is a registered trademark of Lotus Development Corporation).

The expression "textual information" is defined to be any kind of written information. "Textual information" is not limited to human-readable or human-understandable information. This expression is also meant to cover program strings, e.g. in machine-readable form, or encoded information, e.g. as transmitted through a network.

The expression "theme" is herein used to describe the area, field, matter, topic, or subject to which the original information is deemed to be related.

The word "access pointer" is herein used to describe a relative or absolute pointer that points to a file in a file structure or a file directory, or a sequence number or coordinates for the retrieval of an element, e.g. a string of text or cell, from a database, or a link to an image from an image repository. A hypertext link or similar means can also be an access pointer. Another example of an access pointer is a sequence number or a set of coordinates for the retrieval of a string of text or-cell from a database. One has various options when adding an element to a database, according to the present invention. If an access pointer between said element and the semantically unit representing it exists, then one can either maintain that access pointer, or create a new one. If there exists no such access pointer, then a new access pointer has to be created.

A crucial component of the present invention is the so-called knowledge database which is addressed in the following sections. This knowledge database has a unique structure, as described in co-pending PCT patent application with application number PCT/IB99/00231, filed on Feb. 11, 1999, with a priority date of Jun. 2, 1998, which is currently assigned to the present assignee. This co-pending patent application is incorporated in its entirety.

Knowledge database: A knowledge database is a kind of library describing the knowledge of the world, or a particular area of interest thereof, by using a well-defined structure that consists of components such as possible relevant types of semantical units and their possible mutual connections, as schematically illustrated in FIG. 1. The knowledge database used in connection with the present invention consists of semantical units and various types of connection objects 3 between semantical units, where the connection objects 3 themselves may be regarded as semantical units. Each connection object 3 may carry a fixed or variable weight (herein also called semantical distance), where a suitable function of the weight of a connection object 3 represents some kind of semantical distance between the two semantical units it connects, i.e., it represents the degree of (semantical) association between the two semantical units across this particular link If the weight is always between 0 and 1, then one such suitable function to compute the semantical distance is the negative logarithm of the weight, $d=-\ln(w)$.

Since the weights are attached to the links, it is clear which two semantical units' semantical distance they correspond to. Weights are not compared, but used to compute the semantical distance of any two linked semantical units (the two semantical units may be connected through further semantical units, their semantical distance then being the sum or some other suitable combination of the individual distances). Thus, this concept of semantical distance establishes a metric on the knowledge database. Finally, it is advantageous to use a variable or fixed threshold below which connections are ignored. So if two semantical units are connected through (for instance) three links (thus involving two more semantical units), and the product or other suitable combination of the three weights is below the threshold (or, equivalently, the sum or other suitable combination of the three distances is above a different threshold), then one can assume that there is no association between the two semantical units. This method allows to make the network local, i.e., each semantical unit has only a limited number of associations and the local network structure around each semantical unit is not too difficult For example, there are no loops which could cause contradictions. A local network is herein also referred to as a subset.

Furthermore, the weights used herein might be variable. This means that the weights can be adjusted depending on the given/presumed theme. Certain rules for adjusting the weights according to the given/presumed theme might be stored in special semantical units attached to the links to which the respective weights are attached. The present system could for example build a user specific profile by evaluating and analyzing the user's actions. The information derived from such a profile could then be used to alter certain weights. This allows to tailor the present scheme or system to specific users or a set of users. Members of an accounting team and members of a purchasing department, for example, use terms and expressions differently. The present scheme can be adopted to such a situation.

Semantical units in the knowledge database may carry a "potential". If a semantical unit carries a potential it corresponds to the semantical units importance in relation to the: segment or semantical unit from the input string under investigation.

The "matching link" from a segment or semantical unit of the input string to a semantical unit in the knowledge database may carry a "fitness", which could be a special kind of weight. If a matching link carries a fitness it corresponds to the classification probability, i.e. the probability that the segment or semantical unit from the input string has been correctly matched with a semantical unit in the knowledge database.

When referring to a knowledge database, either a library describing knowledge of the world, or a library with application-specific information is meant. The knowledge database reflects the knowledge of a certain area or field. The content of this knowledge database always forms a subset of the content of the real world, corresponding to a limited life experience of the computer and the human being who programmed the computer. However, a knowledge database can be expanded either by automated learning from analyzed input, or by adding separately obtained sub-worlds (e.g. in the form of application-specific modules). It is conceivable to provide updates for the knowledge database through an intranet or internet. Likewise, one might for example link a particular knowledge database when searching for a piece of information in a database, or when looking for a file in a network.

The structured representation of aspects of the world with the knowledge database is achieved by a multiscale approach related to the work of B. Mandelbrot and K. Wilson. Self-similar representations are used on different scales to describe the behavior of objects in a dynamical hierarchical network, as will be described in connection with an example (see FIG. 4). Furthermore, self-similar algorithms are used when making use of the knowledge contained in this database. However, the inventive approach goes beyond the theory of B. Mandelbrot and K. Wilson and predominantly deals with the behavior of elements and structures rather than with their appearance.

The inventive knowledge database is a complex fractal hierarchical network of semantical units.

Index database: The index database is a database which is used to discover and/or retrieve elements from a database, such as a file from a file structure or a file directory, a string of text or cell from a database, or an image from an image repository. The structure of the index database is similar to the one of the knowledge database described above, i.e., the index database has a fractal hierarchical structure. Note that the index database can be a logical construct within the knowledge database which means that the index database is not necessarily a separate, individual database. The index database can be a subset of the knowledge database, or it can be a database that was derived from the knowledge database.

The index database can be built or augmented using information from the knowledge database (e.g., a world database).

Fractal hierarchical network: A network consists of nodes (here called semantical units) and links (here called connection objects 3) between the nodes. A network is called hierarchical if, besides the normal, non-scaling links, there are also scaling links, which can be for example of the type ". . . is kind of x" (hyponyms), "x is kind of . . . " (hypernyms), ". . . is part of x" (meronyms), and "x is part of . . . " (holonyms) for a given node x, where the first and second relation type groups several nodes by their similarity to one new node, and the third and fourth relation type groups several nodes by their functional connection to one new node. Examples are: a license agreement, a joint project agreement, and an employment contract which are all grouped in the semantical unit 'agreements' by their similarity (they are all agreements), while a liability provision, a license grant provision, and an arbitration provision are all grouped in the semantical unit 'agreement' by their functional connection (they are all functional parts or elements of an agreement).

A hierarchical network is called fractal if the following four conditions are satisfied:

All nodes are similar (derived from one template).

All links are similar (derived from one template).

Links may also be nodes.

Hierarchical links are possible, and at least one node must have a hierarchical link.

The construction of a fractal hierarchical network, as employed herein, is achieved as follows. The network is given by a list of semantical units and connection objects 3, as illustrated in FIG. 1. There might be different types of semantical units (information objects, which in turn might be objects 1 or attributes 2, as defined later, or connection objects 3, also defined later) and connection objects 3 (all four possible combinations of the types horizontal or scaling, and relation or exchange, all defined later, each of which may be further divided, such as scaling exchange into attribute and role connections, also defined later). The fact that connection objects 3 are special types of semantical units allows for the fact that links may be nodes and thus that other semantical units may point at connection objects 3. The scaling connections can be oriented upwards or downwards, while the horizontal connections are oriented horizontally (note that these directions are used to better define the hierarchical structure of the network, e.g. downward connections point to a lower hierarchical level). The various semantical units are interconnected in various ways. Some of the connection objects 3 are hierarchical representing the multiscale approach. Knowledge is presented in the knowledge database as an associative network.

Algorithms can operate on elements at any hierarchical level of a fractal hierarchical database (e.g., the knowledge database and/or the index database) in the same way, making them 'fractal' algorithms. These algorithms may even be seen as special types of semantical units themselves and thus exist locally within the fractal hierarchical database. Every semantical unit is linked to its associative semantical unit. These associative links reflect how the system understands each semantical unit. It is important to note that these connections can exist between any two semantical units. The connection objects 3 themselves may be regarded as semantical units that can have connection objects 3 to other semantical units, reflecting the fact that something could act on the association between two semantical units rather than on the individual semantical units. According to the present invention, the complex information about the structure of a database containing many elements with possibly different contents, which is needed to efficiently (i.e. in a user-friendly way) interact with the database, is significantly simplified through the fractal organization of the respective index database.

The fractal organization of the index database also greatly simplifies the data entry into the index database and the learning/updating of the index database by drawing information from the knowledge database. The complex network is created automatically, possibly by taking into account additional information provided by the user.

Semantical units: A semantical unit is a set that contains one or several pieces of information. It may be represented by a word, an object 1, an attribute 2, a connection 3, a combination of words and/or objects 1 and/or attributes 2 and/or relations, a (hierarchical) network of words and/or objects 1 and/or attributes 2 and/or relations, a part of a sentence or a whole sentence, a part of a paragraph or a whole paragraph, or a part of a story or a whole story. A semantical unit of the index database might be associated via an access pointer to an element in a database, such as a file in a file structure or a file directory, for example. This access pointer could be realized as a connection that corresponds to a horizontal similarity relation.

Semantical units in the knowledge database and index database: In these databases semantical units are used as in the above definition. A semantical unit is given by a word, phrase (representing the name), or an element name (e.g., a file name), for example, and by all the connections attached to it. For the present implementation the following types of semantical units are defined: information objects, further subdivided into objects 1 and attributes 2, and connection objects 3, further subdivided into all four possible combinations of the types horizontal connection or scaling connection, and relation connection or exchange connection, where scaling exchange connections are further subdivided into attribute connections 4 and role connections 5. Note that it is also possible to define a larger or smaller number of semantical units.

object 1: Semantical units of this type correspond to individual semantical units that exist independently of other semantical units. Every object 1 might have a set of connections to other objects 1. Each connection may have a weight corresponding to the semantical distance of the two objects it connects. Every object 1 might have a set of connections to other attributes which correspond to the possible attributes 2 the object 1 can take. Each connection might have a weight corresponding to the semantical distance of the object 1 and the possible attribute 2 (i.e. the importance of the attribute 2 for the object 1). Every object 1 might have a set of connections to other connection objects 3 which correspond to the possible relations the object 1 can play a role in. Each connection might have a weight corresponding to the semantical distance of the object 1 and the possible relation it can play a role in. An access pointer might be associated with an object 1 of the index database to allow access to the element which is represented by this object 1 of the index database.

Note that a connection object 3 is in fact a special type of semantical unit and can thus be pointed at by other semantical units. This reflects the fact that some semantical units may take influence on a possible relation or possible attribute of an object 1. Note that a semantical unit might also take influence on the access pointer, e.g. by altering the relative address of an element in the database.

attribute 2: Semantical units of this type correspond to semantical units that represent detailed information about particular states of objects 1 and relations. As such, every attribute 2 might have one or many possible values. Values may be a string, an integer value, a float value, a vector, or any other ordered or unordered set. Every attribute 2 might have a set of connections to other attributes 2. Each connection may have a weight corresponding to the semantical distance of the two attributes it connects. Time and space may be special attributes. If pointed at by an object 1, they refer to the time and space when and where an object 1 exists or is valid; if pointed at by a relation they refer to the time and space when and where a relation takes place; and if pointed at by an attribute 2 they refer to the time and space when and where a state is assumed.

Note that here also each of these connection objects 3 is in fact a special type of semantical unit and can thus be pointed at by other semantical units.

The date of creation, date of last revision, language of document, name of owner, etc. may be typical attributes 2 of an element in the database system.

connection object 3: Semantical units of this type correspond to semantical units that represent relations of any kind between semantical units of all types. Every connection object 3 might have a set of connections to other connection objects 3. Each connection 3 may have a weight corresponding to the semantical distance of the two connection objects 3 it connects. Every connection object 3 might have a set of connections to other objects 1 which correspond to the possible roles the object 1 can play in the relation expressed by the connection object 3. Each connection might have a weight corresponding to the semantical distance of the connection object 3 and the possible role (i.e. the importance of the role for the connection object). Every connection object 3 might have a set of connections to other attributes 2 which correspond to the possible attributes the connection object 3 can take. Each connection 3 might have a weight corresponding to the semantical distance of the connection object 3 and the possible attribute 2 (i.e. the importance of the attribute for the connection object).

Note that here also each of these connection objects 3 is in fact a special type of semantical unit and can thus be pointed at by other semantical units.

Types of connection objects: The connection objects 3 can be viewed as directed associative connections between semantical units. Some of them establish the hierarchical structure. The knowledge database and/or the index database according to the present invention might comprise the following types of connection objects:

Scaling connections: There are two kinds of scaling connections (see FIG. 1); scaling relations 9 (similarity connections) and scaling exchanges 8 (functional connections). Both kinds can point either in upward or downward direction, corresponding to hierarchical associative connections.

Horizontal connections: There are two kinds of horizontal connections (see FIG. 1); horizontal relations 7 (similarity connections) and horizontal exchanges 6 (functional connections), corresponding to non-hierarchical associative connections.

Attribute connections 4: This is one kind of connection, corresponding to possible attributional associative connections (e.g. semantical units pointing at other semantical units which can be their possible attributes). Note that an attribute connection may be regarded as a special kind of horizontal exchange.

Role connections 5: This is one kind of connection, corresponding to possible role of associations (e.g. semantical units pointing at other semantical units which can occupy their possible roles). Note that a role connections may be regarded as a special kind of horizontal exchange.

The above-listed connection objects 3 may be regarded as semantical units and, therefore, might have the same classes of connections attached to themselves. This corresponds to the complexity of associations in the real world.

The structure of the present knowledge database and index database extends the object-oriented concept in the following sense. One might have an object (or class) "car" in the inventive knowledge database, and in a given input string one may find an instance of this class, a specific car, say, "Mr. Dent's Ford". Then (as an instance) "Mr. Dent's Ford" carries all the data and member functions of the class "car". However, not all data may be specified, for instance, the color may not be specified and it must not be set to any default value (e.g. red) by the constructor. Even worse, "Mr. Dent's Ford" may carry data that is not defined in the class "car", because this knowledge is not yet known to the knowledge database. So the object "Mr. Dent's Ford" is only what is called an "approximate" instance of the class "car". Another general problem is inheritance. Only subclasses can inherit definitions from their superclasses. So if one wants to employ the concept of inheritance in strict object-oriented terminology, all entries in the present knowledge database and index database must be individual classes, some of them subclasses of others. However, this does not allow for "horizontal/associative" connections because two classes cannot be connected by a link (only their instances can).

BASIC SCHEME OF THE PRESENT INVENTION:

According to the present invention there are four different processes.
1. Adding an element to a database system,
2. Acting upon an element kept in a database system,
3. Creating an index database for use in connection with a database system, and
4. Updating an index database for use in connection with a database system.
   1. These four processes will now be addressed in connection with a database system that comprises a knowledge database and an index database. Both these databases have a fractal hierarchical structure.
   2. Adding an element to a database system: If an element is to be added to a database in accordance with the present invention, the following steps are carried out.
   3. An (augmented) input network is generated from an input string which describes the element. This augmented input network is deemed to be related to the element that is to be added to the database system. It comprises a semantical unit representing the element which is to be added to the database. It furthermore comprises this semantical unit's relations to semantical units in the knowledge database or in the index database. The knowledge database may be consulted in obtaining the augmented input network. The input string can be created by a user or an application, or it can be automatically generated from the element that is to be added to the database system. This can be done by a mechanism that crawls through the element to extract information which is characterizes the element and/or its content. An automatic object recognition scheme might be used for that purpose. The input string can be the name of a file, for example.
   4. Instead of generating the augmented input network from an input string, the content of the element to be added can be analyzed and the result can be used to generate the augmented input network. In this case an input string is not necessarily needed. Again, this augmented input network is deemed to be related to the element that is to be added to the database system. It comprises a semantical unit representing the element which is to be added to the database. It furthermore comprises this semantical unit's relations to semantical units in the knowledge database or in the index database. The knowledge database may be consulted in obtaining the augmented input network.
   5. It is also conceivable that a combination of the above two methods is used to generate the augmented input network. In this case, both an input string and the contents of the element would be taken into account to generate the augmented input network.
   6. In the next step the index database is updated with information describing or defining the newly added element. This can be done by associating the input network with the index database, or by adding the semantical unit or the input network to the index database. As discussed above, the index database is of hierarchical nature and all elements are alike, so that the augmented input network to be added to the index database preferably has a fractal hierarchical structure.
   7. In order to allow a system or user at a later point in time to act upon the element to be added, an access pointer is created. This access pointer provides a physical or logical link (e.g. a memory address) between the semantical unit representing the element and the element as such. The access pointer can be used for accessing the element in the database, or for retrieving the element from the database, or for opening the element using an appropriate application program (e.g., a text processor), or for displaying the element, or for performing an operation on the access pointer as such. One might for example take the access pointer and send it to another user. The access pointer may describe the physical or logical location where said element is stored in the database.
   8. Acting upon an element kept in a database system: If an element in a database is to be acted upon in accordance with the present invention, the following steps are carried out.
   9. Before a user or system can act upon an element in the database, the respective element must be located. In order for the system to be able to locate the element, an input string is needed which contains information that helps to identify the element. This input string is received by the system. The input string may comprise keywords, or textual information. The keywords or textual information can either be human readable or machine readable. To improve the interaction between a user and the system, a speech recognition module can be employed such that the user can 'talk' to the system. The speech recognition module then transforms the speech into textual information which is then processed the same way as other input strings. Another way to improve the interaction between a user and the system is to install a camera that is used to record the user's behavior. An image recognition module then transforms the behavior into textual information which is then processed the same way as other input strings. In all cases the textual information may be evaluated by consulting the knowledge database.

Then, the input string is evaluated. This is done to obtain an (augmented) input network which in turn defines a local network within the index database. The local network is defined to be a portion, or segment, or set of segments of the index database to which the input string is deemed to be related. The local network is defined such that it comprises at least one semantical unit which represents an element (i.e. which has an access pointer to a database element) to which the input string seems to be related or associated. If no related or associated semantical units are found the process is stopped, or the user or system might be prompted for additional information which helps to clarify the information conveyed in the input string. The knowledge database may be consulted in obtaining the augmented input network. The local network within said index database can be defined such that it comprises semantical units that represent elements which are in a semantical neighborhood (as computed from the distance finction) to the semantical units of the augmented input network. In other words, the local network within said index database can be defined such that it comprises semantical units associated to the input string.

Assuming now, that at least one related or associated semantical unit was found, this(these) semantical unit(s) is(are) displayed. The semantical unit(s) can be displayed on a screen, for example, or they can be highlighted inside the network representing the index database or knowledge database. The semantical units can be arranged or displayed to give the user clues about content of the element their access pointer points at (e.g. filenames in a file system). The system may create a human-understandable output, such as a map or other kind of visual or audible representation of the semantical units that the system deems are related to the information the user is looking for.

If there is just one semantical unit that is deemed to be related or associated to the input string, the user or the system can act upon the corresponding database element by using the access pointer that is associated with this semantical unit. The access pointer can be used for accessing the element in the database, or for retrieving the element from the database, or for opening the element using an appropriate application program (e.g., a text processor), or for displaying the element, or for performing an operation on the access pointer as such. One might for example take the access pointer and send it to another user. The access pointer may describe the physical or logical location where said element is stored in the database.

If there is more than one semantical unit that is deemed to be related or associated to the input string, the user or system can act upon one or more of the respective elements by using the access pointers that are associated with these semantical units. Alternatively, the user may be prompted for additional information to clarify the input string and reduce the number of semantical units that are deemed to be related or associated to the input string.

10. An element can be acted upon using a computer mouse, a key on a computer keyboard, or a combination of keys on a computer keyboard, for example.

11. Creating an index database for use in connection with a database system: An index database for use in connection with the present invention can be created as follows.

12. Note that there are two ways for adding an element to a database: 1) it either can be added physically to the database which means that the elements content is moved into the database, or 2) it can be added logically. In this case the physical element remains outside the database, i.e., it is not moved into the database, but just a semantical unit representing this element is added to the database.

13. If a first element is received that is to be added to a database system, and there is no index database present yet, an initial index database must be created. In this case, just as in the case of adding an element to a database system, it is important to generate information which describes this element. This is crucial for later acting upon the element. This information is used to create the index database. This is done by generating an (augmented) input network which comprises a semantical unit representing the element which is to be added to the database. It furthermore can comprise this semantical unit's relations to semantical units provided in the knowledge database. The knowledge database may be consulted in obtaining the augmented input network.

14. Then, the newly created augmented input network (which is a fractal-hierarchical network) is called the newly created index database.

15. Updating an index database for use in connection with a database system: An existing index database for use in connection with the present invention can be updated as follows.

16. The structure of the index database is compared to the structure of the knowledge database. This is done by comparing the semantical units of the index database and their connections (which are also semantical units) to their counterparts in the knowledge database. In particular, the structure of the neighborhoods of all semantical units are compared. If this comparison reveals that there are additional semantical units or connections in the neighborhoods of semantical units in the knowledge database (compared to the neighborhoods of their counterparts in the index database) then these additional semantical units may be copied into the index database. This enriches the structure of the index database and creates new relations among the database elements (through their representing semantical units in the index database) which were previously unknown. If a structural mismatch is discovered, then one or several semantical units in the index database (as long as they don't refer to a database element) may be deleted. This may correct invalid relations of database elements that were previously created.

17. An existing index database can be updated if an element is received that is to be added to a database system. In this case, just as in the case of creating an initial index database, it is important to generate information which describes this element. This is crucial for later acting upon the element. This information is used to updated the existing index database. This is done by generating an (augmented) input network which comprises a semantical unit representing the element which is to be added to the database. It furthermore comprises this semantical unit's relations to semantical units provided in the knowledge database. The knowledge database may be consulted in obtaining the augmented input network.

18. Then, the newly created augmented input network (which is a fractal-hierarchical network) is associated with or added to the existing index database.

The inventive approach allows for an automated apprehension of the meaning and/or the information conveyed in an input string and possibly for a discovery of elements in the database matching the input string or being related to the information conveyed in the input string. It also allows for the discovery of new and previously unknown relations among elements in the database.

DETAILED EMBODIMENTS OF THE PRESENT INVENTION

First embodiment

A database system 10 according to the present invention comprises a knowledge database 11, an index database 13, and a processing unit. This processing unit may be realized in hardware and/or software and comprises a semantic processor, for example. An input string 12 is received by the system 10 and the input string 12 (e.g. a text or a speech) is processed by a semantic processor 14 to generate a semantical network. The input string 12 may comprise keywords, or textual information. The keywords or textual information can either be human readable or machine readable. The input string 12 may be evaluated by consulting the knowledge database 11. A processing unit performs the evaluation of the input string 12 to obtain a semantical network defining a local network within the index database 13. The local network is the portion, or segment, or set of segments of the index database 13 to which the input string 12 is deemed to be related. The local network is defined such that it comprises at least one semantical unit which represents an element to which the input string 12 seems to be related or associated. If no related or associated semantical units are found the process is stopped, or the user or system might be prompted for additional information which helps to clarify the information conveyed in the original input string 12.

The local network within said index database 13 can be defined such that it comprises semantical units that represent elements which are in a semantical neighborhood. In other words, the local network within said index database 13 can be defined such that it comprises associated semantical units.

If the input string 12 comprises keywords, then a semantic processor 14 might not be needed because an association between these keywords and the semantical units of the index database 13 can be established by the processing unit right away.

If one or more related or associated semantical units were found an output 15 is generated. The output 15 might be displayed on a screen, for example, or it can be highlighted inside the network representing the index database 13, or knowledge database 11. The output 15 may be a human-understandable output, such as a map or other kind of visual or audible representation of the semantical units that the system deems are related to the information the user is looking.

Second embodiment

Figure 2A:
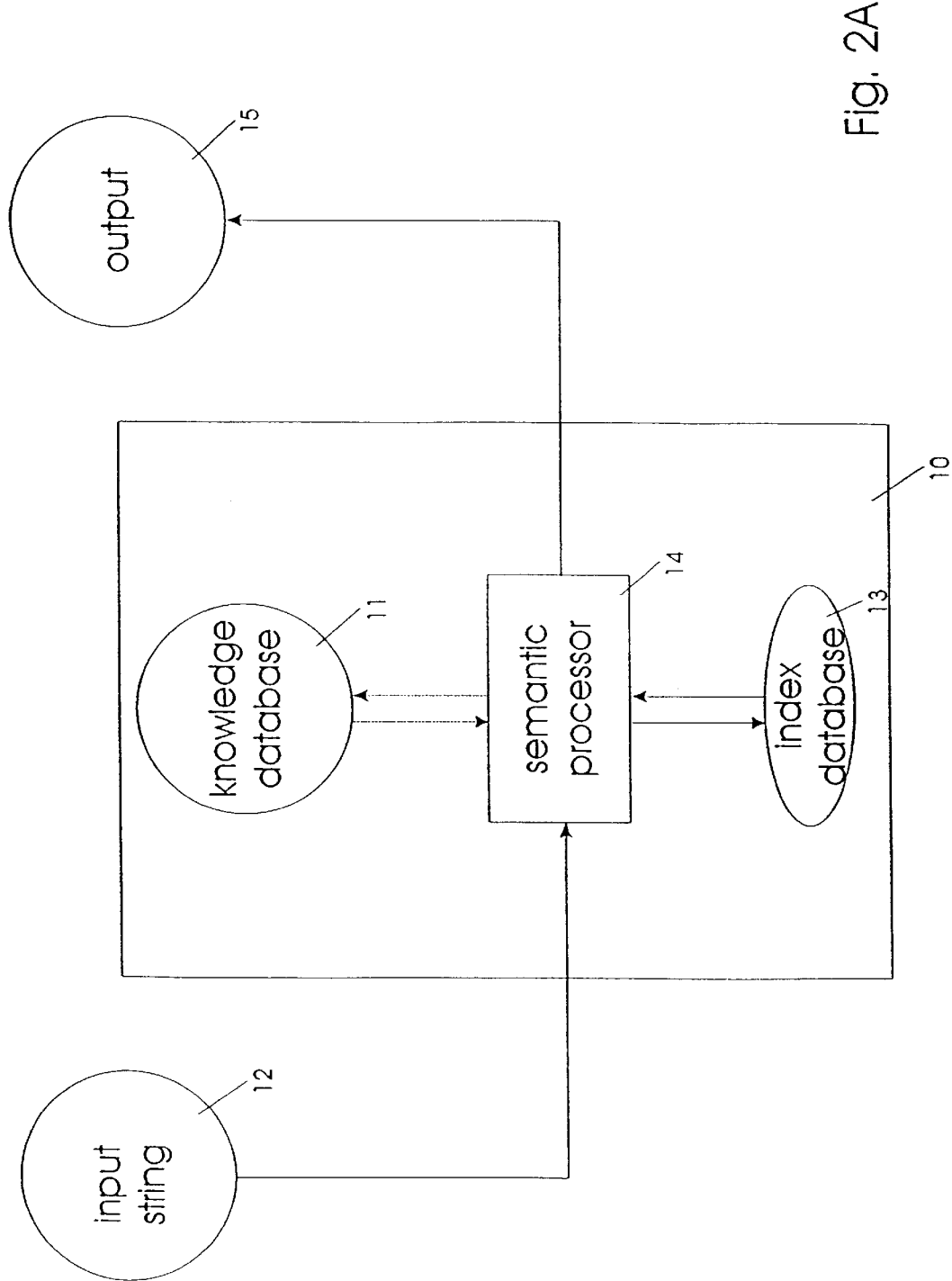
FIG. 2A is a schematic block diagram of a first embodiment, in accordance with the present invention.
Figure 2B:
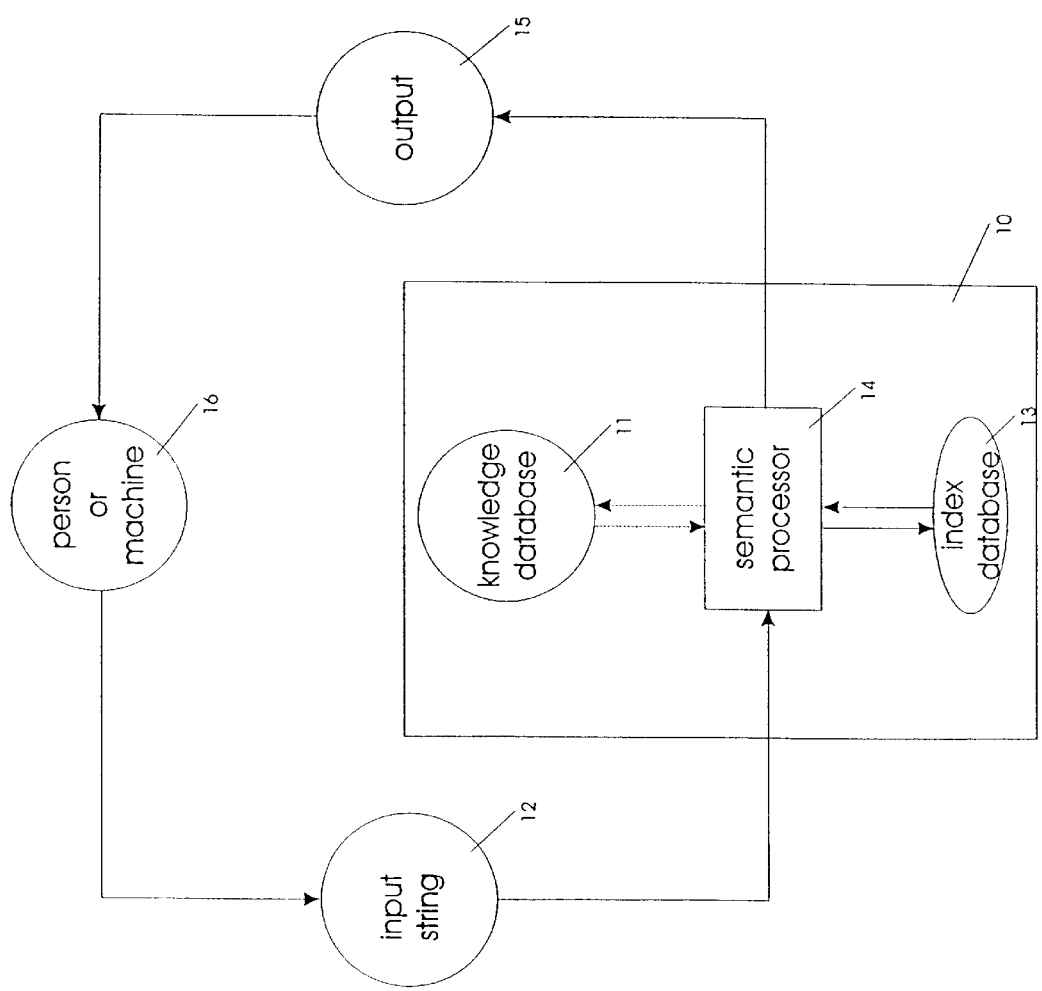
FIG. 2B is a schematic block diagram of a second embodiment, in accordance with the present invention.

The second embodiment adds feedback loop which allows a user 16 or system to interact with the system 10, as illustrated in FIG. 2B. This allows a user or system to modify the original input string 12 and run through the process a second time. Depending on the complexity of the index database 13, or the lack of information in the input string 12, several iterations might be required to finally identify at least one element in the database 10 that is deemed to be associated with the information in the input string 12.

Third embodiment

Figure 2C:
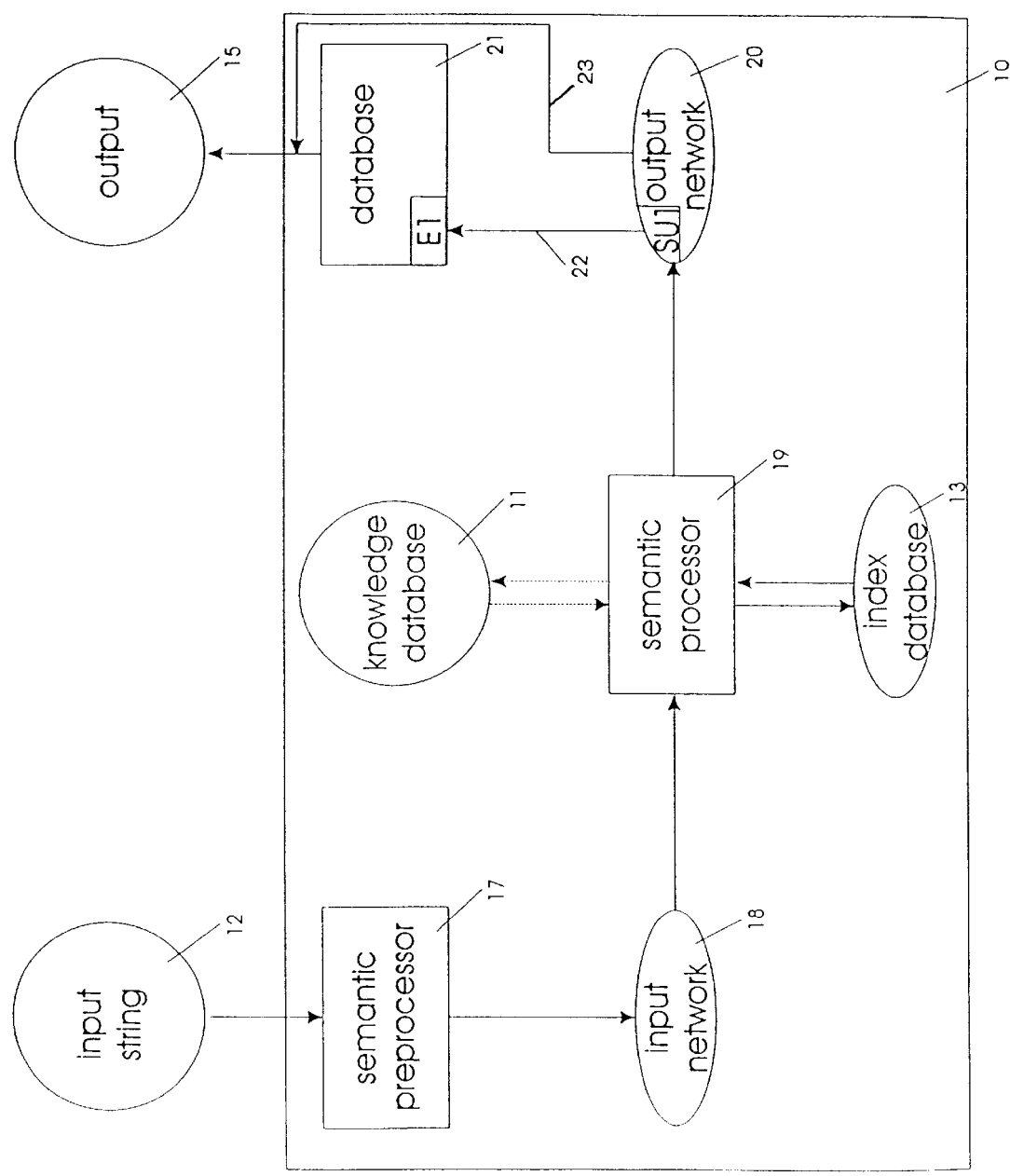
FIG. 2C is a schematic block diagram of a third embodiment, in accordance with the present invention.

According to the present invention, an input string 12 (e.g.,a text or a speech) is transformed into a formal network 18 (herein also referred to as input network) of semantical units, as illustrated in FIG. 2C. This might be done by a semantic preprocessor 17. There are various conventional techniques for this transformation, as will be addressed below.

Semantic preprocessor: As mentioned, the semantic preprocessor 17 transforms the input string 12 into an input network 18 (formal network). The semantic processor is part of the database system's processing unit. A semantic preprocessor, as used in connection with a speech recognition module for example, might consist of four parts:

I. Voice or image recognition software to transform speech or gestures into an input string 12. This feature is optional as the input data may already be presented in written form.

II. Grammatical parser to create a syntactical structure of the input string. This syntactical structure exhibits the functional relation of the input string's elements. The grammatical theories of Slot Grammar, Lexical Functional Grammar, General Phrase Structure Grammar, or Discourse Representation Theory, all extensions of the ground-breaking work of Noam Chomsky (Syntactic Structures, 1959) provide possible frameworks for this step. It creates the input (formal) network 18 from the functional structure.

III. Transformer that generates the correct semantical units out of the input string's elements and connects them with connection objects as described in the syntactical structure.

The behavior of a semantic preprocessor 17 is explained below in connection with an example illustrated in FIGS. 3A–3B:

Speech: "Mike was a young boy. He walked to school every morning." Input string: Mike was a young boy. He walked to school every morning.

Syntactic structure: Parser creates syntactic structure which shows the functional relation of the input string's elements. Since there are two separate sentences, the parser creates two syntactic structures 23 and 24, as illustrated in FIG. 3A.

Formal network: Transformer creates correct semantical units and connects them with the correct connection objects. An example of a formal network is illustrated in FIG. 3B.

As shown in FIG. 3A, there is one parse for each sentence. Each parse consists of a tree structure 25, which is to the left of each parse. Each line in the parse represents one word in the sentence. From left to right, each line starts with the parse tree information, the slot descriptor information, the word itself, possibly followed by its meaning and followed by a list of occupied slots, and finally a list of features. For example, in the second line of the first parse 23 we see the tree info (o—) 25, where the (o) means that this is the root node of the tree. Then the slot descriptor information 26 is (top), which means that it is the top element of the sentence.

The word itself is (be), it is not followed by a meaning, but followed by a list of occupied slots (2,1,5). This means that the word itself is the second word in the sentence, the agent role is taken by the first word in the sentence (Mike), and the object role is taken by the fifth word in the sentence (boy). Finally the list of features 27 reads (verb vfin vpast sg vsubj), which means that the word is a finite verb in past tense, singular conjugation. Another example is the sixth line of the second parse 24. We see the tree info (\-+-) 25, where the (\) means that this node is a subnode of the root node of the tree, and the (+) means that subnodes branch off this node. Then the slot descriptor 26 information is (vadv), which means that this node (and its subnodes) are an adverbial phrase to the verb. The word itself is (morning), it is followed by a meaning (1), which means that 'morning' is used in the sense that is represented by the first occurrence of 'morning' in the dictionary of Slot Grammar. It is followed by a list of occupied slots (6,u). This means that the word itself is the sixth word in the sentence, and that the second slot is unoccupied. Finally the list of features 27 reads (noun cn sg tm), which means that the word is a count noun in singular conjugation which carries time information.

Figure 3B:
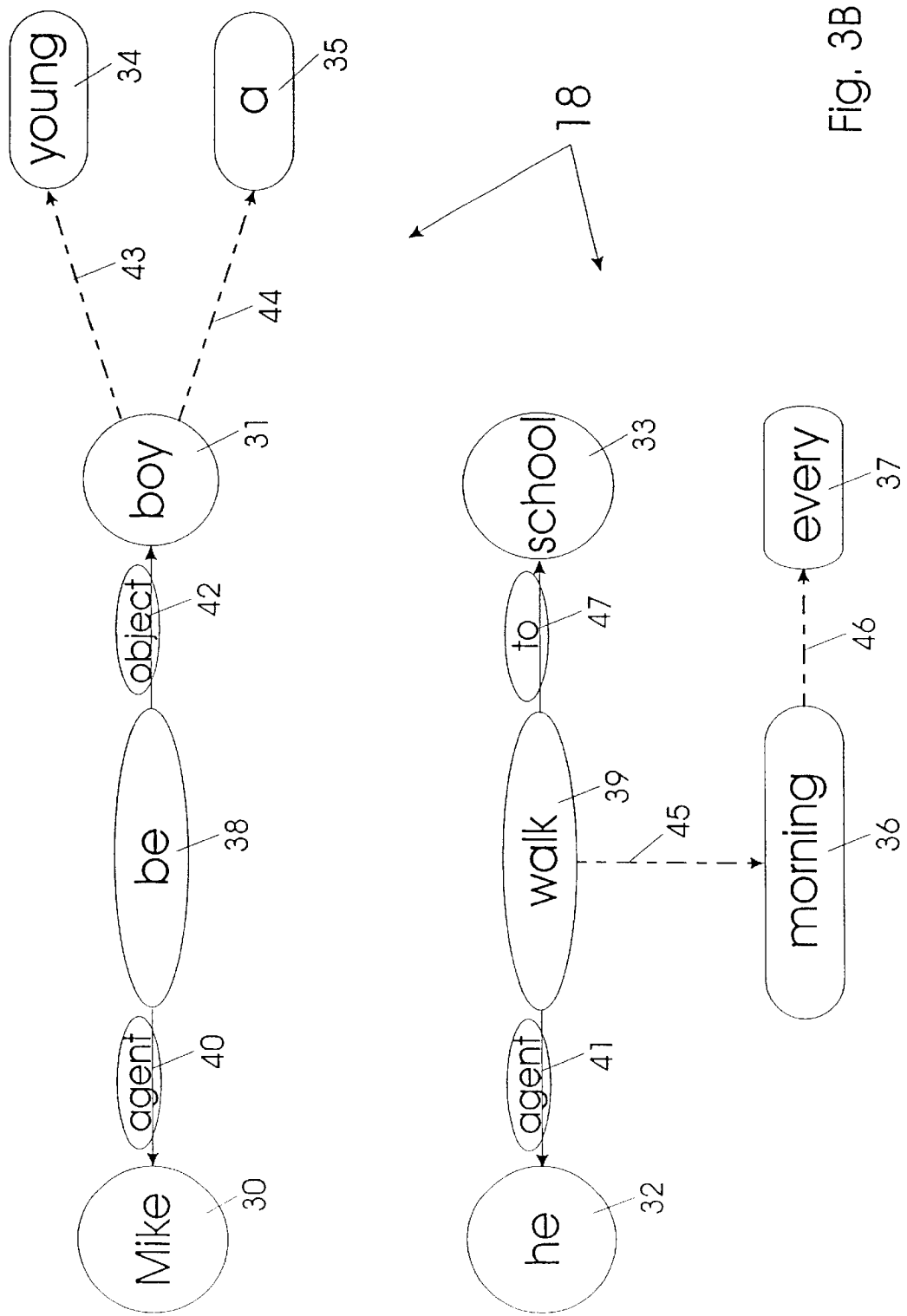

Then, the semantic preprocessor 17 generates an input network (formal network) 18, which is shown in FIG. 3B. This network 18 comprises four objects 30–33, four attributes 34–37, two connection objects 38–39, two agent role connections 40–41, one object role connection 42, four attribute connections 43–46, and one horizontal relation 47. It is to be noted that the above details are merely given to describe how an input network 18 can be obtained and what its structure might be.

Once the input network 18 is created, the semantical processing commences. This can be done following any one of six procedures that lead to an equivalent result, namely a local network within the index database 13.

1) The semantic processor 19 takes the input network 18 and locates a subset in the knowledge database 11 that is deemed to be the best fit for all semantical units in the input network 18. This subset together with the original input network is then called the augmented input network.

2) The semantic processor 19 takes the input network 18 and expands it with related semantical units from the knowledge database 11. This expanded input network together with the original input network is then called the augmented input network.

3) The semantic processor 19 creates a new fractal hierarchical network of semantical units and pointers from the input network 18 and the knowledge database 11, where the components are selected according to a matching algorithm. The newly created fractal hierarchical network together with the original input network is then called the augmented input network.

4)–6) are equivalent processes to 1)–3), but the semantic processor uses the index database 13 instead of the knowledge database 11.

The augmented input network (created by any of the above processes) reflects both the general meaning and the individual aspects of the input string 12 and is—like the knowledge database 11—represented by a fractal hierarchical network of semantical units. The creation of the augmented input network by any of the above processes is performed by a matching algorithm with data in the knowledge database 11 and/or data in the index database 13. For the creation of the augmented input network information may be extracted from the knowledge database 11 and/or the index database 13.

There are different ways to implement the semantic processor 19. The actual implementation depends on the question whether one wants the augmented input network to be defined as a subset within the knowledge database 11 (1st implementation), or the input network 18 to be expanded with semantical units from the knowledge database 11 (2nd implementation), or a new augmented input network to be generated from the knowledge database 11 (3rd implementation), or the augmented input network to be defined as a subset within the index database 13 (4th implementation), or the input network 18 to be expanded with semantical units from the index database 13 (5th implementation), or a new augmented input network to be generated from the index database 13 (6th implementation).

The semantic processor 19 may create an appropriate output, which in case of the 3rd embodiment is an output network 20. This output network 20 has at least one semantical unit SU1 that points via an access pointer 22 to an element E1 in a database 21. If the user wants to see the element E1, then the fetching and displaying of the element E1 is the output action 15. Note that the output network 20 might be considered to be the output 15, as illustrated by the bypass 23. In this case the database 21 can be omitted.

Note that the implementation of the database system's processing unit and the semantic processor depends on the environment in which it is going to be used. The semantic processor of the first and the second embodiment (FIGS. 2A and 2B, respectively) differs from the semantic processor of the third embodiment (FIG. 2C).

Note that there are no separate Figures illustrating the procedures 4)–6). These procedures are similar to the procedures 1)–3) with the difference that the knowledge database 11 is not consulted when generating the augmented input networks. For this reason the connection between the semantic processors 14, 19 and the knowledge database 11 is dashed to indicate that this connection is optional.

According to the first and second embodiment (FIGS. 2A and 2B), when given an input string 12, the semantic processor 14 creates a first guess of the resulting augmented input network by assigning semantical units (such as objects 1, attributes 2, connection objects 3, etc.) to the segments, individual words, individual keywords, or even semantical units (if the input string 12 contains any) of the input string 12, and connecting these semantical units with connection objects 3 (such as horizontal exchange, horizontal relation, scaling exchange, scaling relation, attribute connections 4, role connections 5, etc.) as the corresponding segments, individual words, individual keywords, or semantical units that they represent are deemed to be connected in the input string 12. Then the semantic processor 14 reads out the possible subsets from the knowledge database 11 or alternatively from the index database 13 that are deemed to be associated with the various semantical units of the above first guess of an augmented input network (which corresponds to the input string 12). It performs a matching of the semantical units of the above guess with semantical units from the knowledge database 11 or alternatively from the index database 13 through classification rules (such as inheritance, implementation, and overwriting rules). The resulting network is then called the augmented input network.

According to the third embodiment (FIG. 2C), the semantic preprocessor 17 creates a first guess of the resulting augmented input network by assigning semantical units (such as objects, attributes, connection objects, etc.) to the segments, individual words, individual keywords, or even semantical units (if the input string 12 contains any) of the input string 12, and connecting these semantical units with connection objects 3 (such as horizontal exchange, horizontal relation, scaling exchange, scaling relation, attribute connections 4, role connections 5, etc.) as the corresponding segments, individual words, individual keywords, or semantical units that they represent are deemed to be connected in the input string 12. Then the semantic processor 19 reads out the possible subsets from the knowledge database 11 or alternatively from the index database 13 that are deemed to be associated with the various semantical units of the above first guess of an augmented input network (which corresponds to the input string 12 and is generated by the semantical preprocessor 17). It performs a matching of the semantical units of the above guess with semantical units from the knowledge database 11 or alternatively from the index database 13 through classification rules (such as inheritance, implementation, and overwriting rules). The resulting network is then called the augmented input network.

In all three embodiments (FIGS. 2A–2C) the augmented input network is then related to the index database 13. First the overlap of the augmented input network with the index database 13 is determined. This yields a subset of semantical units in the index database 13 which are deemed to be related to the augmented input network. This subset is the above mentioned local network in the index database 13.

The next step depends on the selected process (adding an element to the database system or acting upon an element kept in the database system). In the first case the index database 13 is updated. This can be done by adding the augmented input network (which contains a particular semantical unit which carries an access pointer to the element to be added) to the index database 13 such that suitable connection objects to the above identified local network of semantical units in the index database 13 are created. In the second case all semantical units with access pointers to elements kept in the database system of the above identified local network of semantical units in the index database 13 are used to act upon these elements as described earlier.

Prejudgement: During the generation of the augmented input network a "theme"-matching (or prejudgement) might be carried out by the semantic processor 14 or 19. It chooses a theme from the set of possible "themes" which influences the semantical distances of semantical units in the knowledge database 11 or in the index database 13. Such a theme might be stored in special semantical units or in a fractal-hierarchical network of special semantical units. The semantic processor 14 or 19 then verifies how well the semantical units of the input string 12 or the input network 18 match with their (suspected) counterparts in the knowledge database 11 or in the index database 13. Note that for this evaluation the semantic processor 14 or 19 retrieves the requested information (neighborhoods around the suspected semantical units) from the knowledge database 11 or from the index database 13. For this purpose, the semantic processor 14 or 19 uses the following information: a possible theme (defines how to adjust the weights), and a threshold (defines where to cut off the network around a given semantical unit in the knowledge database 11 or in the index database 13). Then all possible combinations of the retrieved neighborhoods from the knowledge database 11 or index database 13, where each neighborhood corresponds to one of the semantical units from the input string 12 or the input network 18 (note that these neighborhoods now depend on the selected theme), are compared for mutual overlap to find out just which combination most likely captures the meaning of the input string 12 (e.g. because it produces the biggest amount of overlap). The resulting set of semantical units from the knowledge database 11 or from the index database 13 together with their corresponding semantical units from the input string 12 or input network 18 form the final augmented input network (note that this network also depends on the selected theme).

According to the third embodiment of the present invention, the information contained in the input network 18 is expanded by adding knowledge from the knowledge database 11 or from the index database 13. To avoid adding the whole content of the knowledge database 11 or the index database 13, the expansion process might be self-controlled by a theme-prejudgement mechanism (derived e.g. by condensing semantical units into more abstract semantical units, or by counting the numbers of connections at individual semantical units of the first guess of the augmented input network, or at any later processing stage of the augmented input network). The prejudgement might be continuously updated and can even be dramatically corrected if a contradiction or a change of theme is discovered. In addition, it determines and/or alters the weights in the knowledge database 11 or in the index database 13, so that if, for instance, a semantical unit's link to another semantical unit is increased, then the second semantical unit's neighbors from the knowledge database 11 or from the index database 13 will also be added to the resulting augmented input network since they may be relevant within the (currently supposed) theme (semantic enhancement). Finally, if an input string 12 is rather long, then the prejudgement might even have a hierarchical structure (i.e. abstracts of abstracts).

It is to be noted that the result of the inventive approach depends on the quality of the knowledge database 11 and/or the index database 13.

In the following, an exemplary algorithmic description of a semantic processor is given. The algorithm below might be used to generate an augmented input network.

---

```
===beginning of algorithmic description =====================
For all objects and connection objects in input
string (omit "be" and "have")                    // suppose there are N such semantical units
{
    For all fitting knowledge database
    entries (string match)                       // suppose there are n,
                                                 //(1<=i<=N)
    {
    Create semantical unit instance
        Inherit all possible attributes from knowledge database
        If (object) Inherit all possible connections from knowledge database (including
            attached roles)
        If (connection) Inherit all possible role objects from knowledge database
```

-continued

```
        Compute isolated fitness:
        {
            f₁ := 1/sqrt(n₁)
            Adjust for implemented attributes: good fit: +25% rel., bad fit: −10% rel.
            Adjust for implemented connections: good fit: +10% rel., bad fit: −50%
rel.
            Adjust for implemented roles: good fit: +10% rel., bad fit: −50% rel.
        {
        Find local neighborhood:
        }
            Set potential of semantical unit to sqrt(k/m)
                // k = # appearances of semantical unit in story up
                    to present sentence
                // m = total number of semantical units in story up
                    to present sentence
            Propagate potential across weights in knowledge database
            Attach everything above min. threshold t_min =0.3
        }
    }
}// yields n₁+...+n_N local neighborhoods
For all combination of local neighborhoods        // there are n₁*...*n_N combinations
{
    Compute local fitness adjustment (cellular automat method):
    {
        Count how many double, triple, etc. overlaps of objects (l₂(t),...,l_N(t))
            // Note that the l_i depend on threshold t
        Ifa₁ = max_{tmin<−t<−1} { ½ + 1/πArcTan(20 t − 10 + 2 sqrt(Σ_{i−2}^N il_i/N) }
            // May improve this formula by making it "source" dependent,
            // i.e. overlaps between subject and predicate count more than others.
    }
    Adjust fitness of each semantical unit in combination with calculated local
    fitness adjustment
    Compute total fitness of combination:
    {
        F_i = (30% pred. fitness + 30% subj. fitness + 20% obj. fitness + 20% other)
            // all of the above relative to 100%, in case any of the categories is
            // missing or multiply present.
    }
}
Pick combination with highest total fitness as correct sentence network
Connect semantical units according to syntactic structure of input string.
===end of algorithmic description =====================
```

Figure 4:
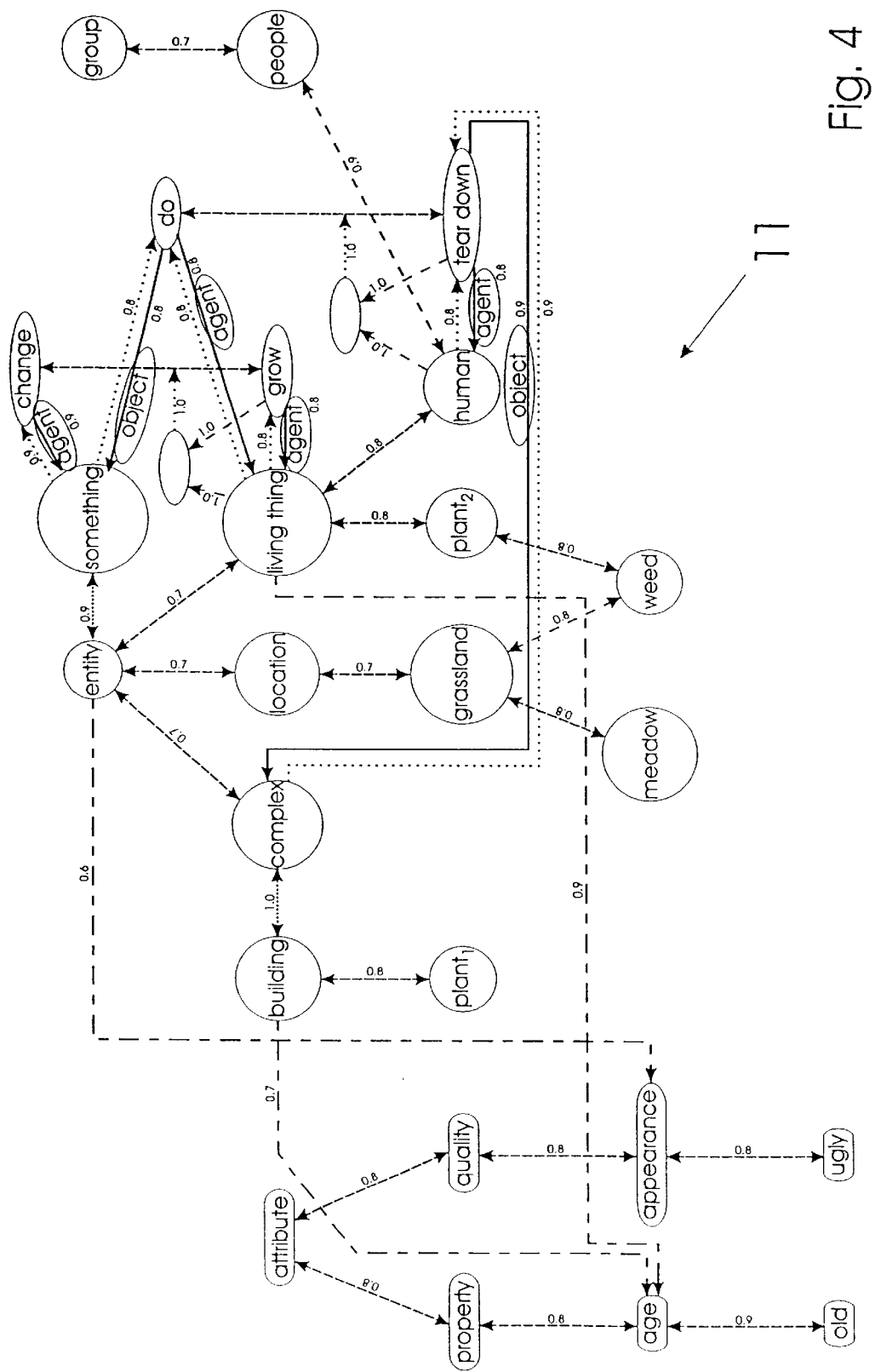
FIG. 4 illustrates a fractal hierarchical knowledge database, in accordance with the present invention.

The operation of a system according to the three embodiments of the present invention is described in connection with the following input text 12 comprising three sentences. The information contained in these three sentences is expanded using knowledge from the knowledge database 11 which is shown in FIG. 4. As can be seen from this Figure, the knowledge database 11 comprises the semantical units illustrated in FIG. 1.

The input string 12 comprising three sentences

I. On the meadow is an old plant.

II. Weeds are already growing next to it.

III. Because the plant is ugly, people will tear it down.

Processing of Sentence I (Comments are Included in Parentheses [. . . ]):

The input network consists of the objects 'plant' and 'meadow'. Plant has the attributes 'old' and 'a', meadow has the attribute 'the'. 'Plant' is connected to the connection object 'be' with an agent role connection. 'Meadow' is connected to the connection object 'be' with a horizontal relation 'on'.

There are only two semantical units that are taken into account, the objects 'plant' and 'meadow'. The connection object 'be' is omitted. We thus have:

First semantical unit: plant

Figure 5:
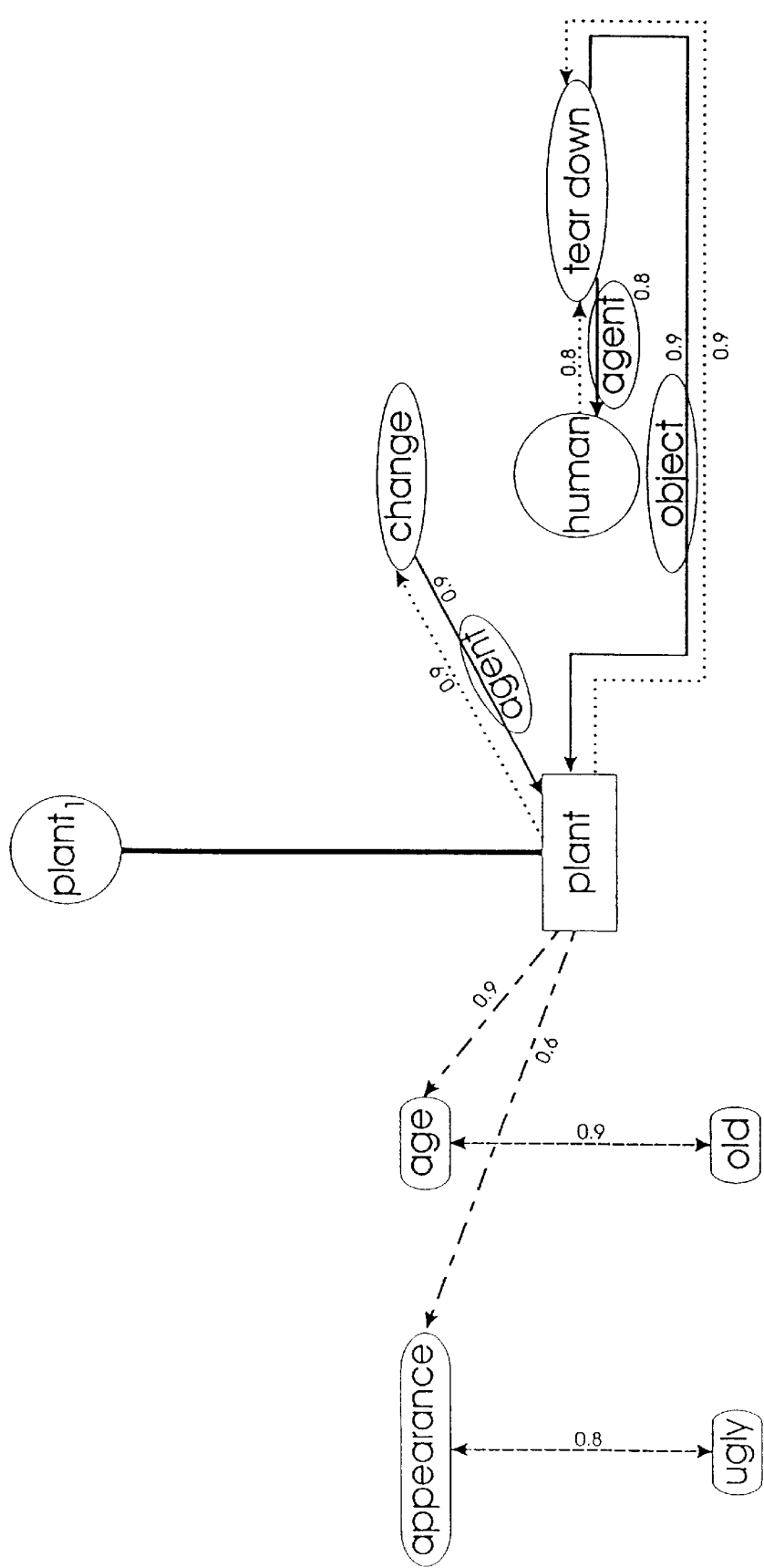
FIG. 5 illustrates inherited attributes and relations of 'Plant$_1$', in accordance with the present invention.
Figure 7:
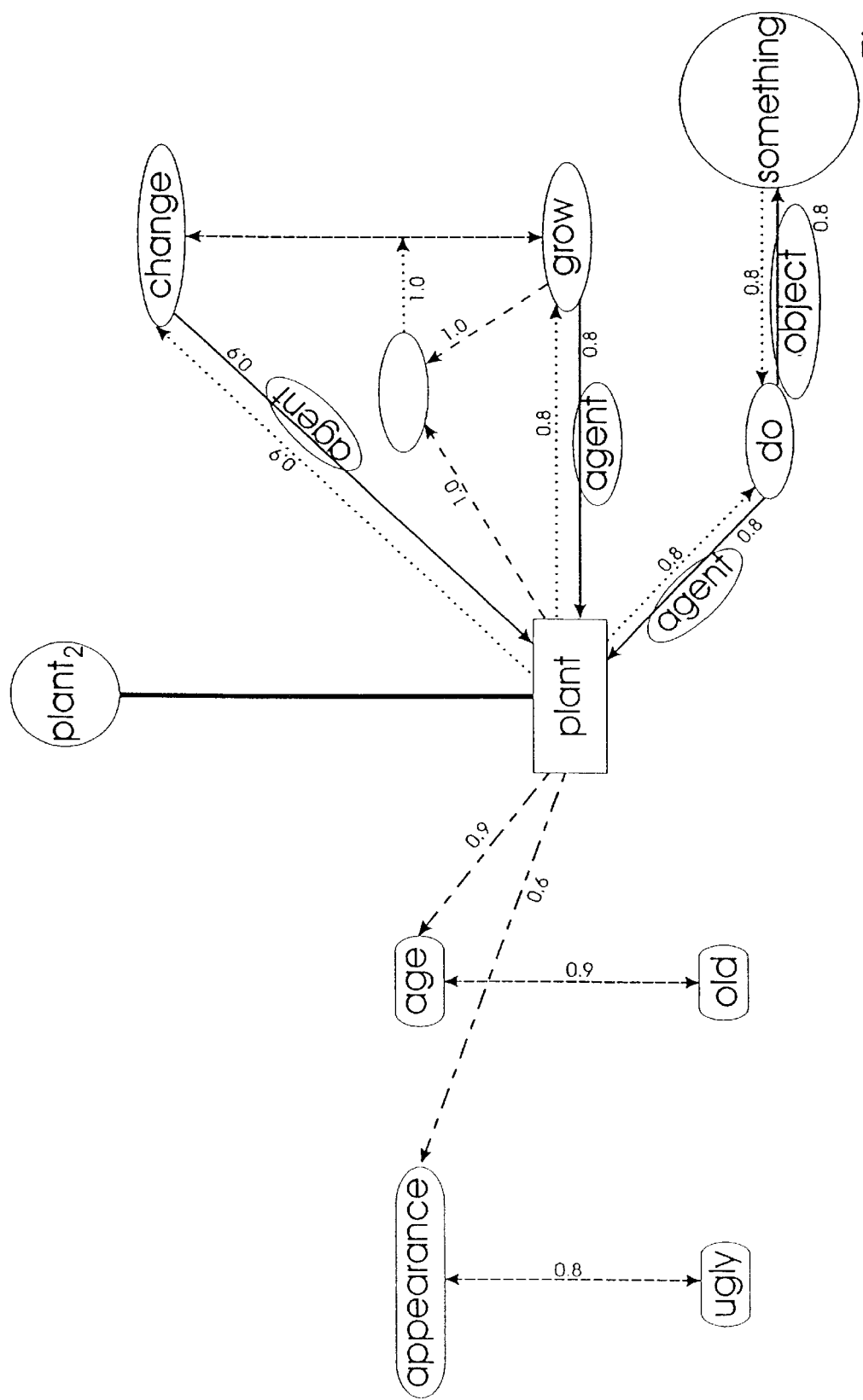
FIG. 7 illustrates inherited attributes and relations of 'plant$_2$', in accordance with the present invention.
Figure 9:
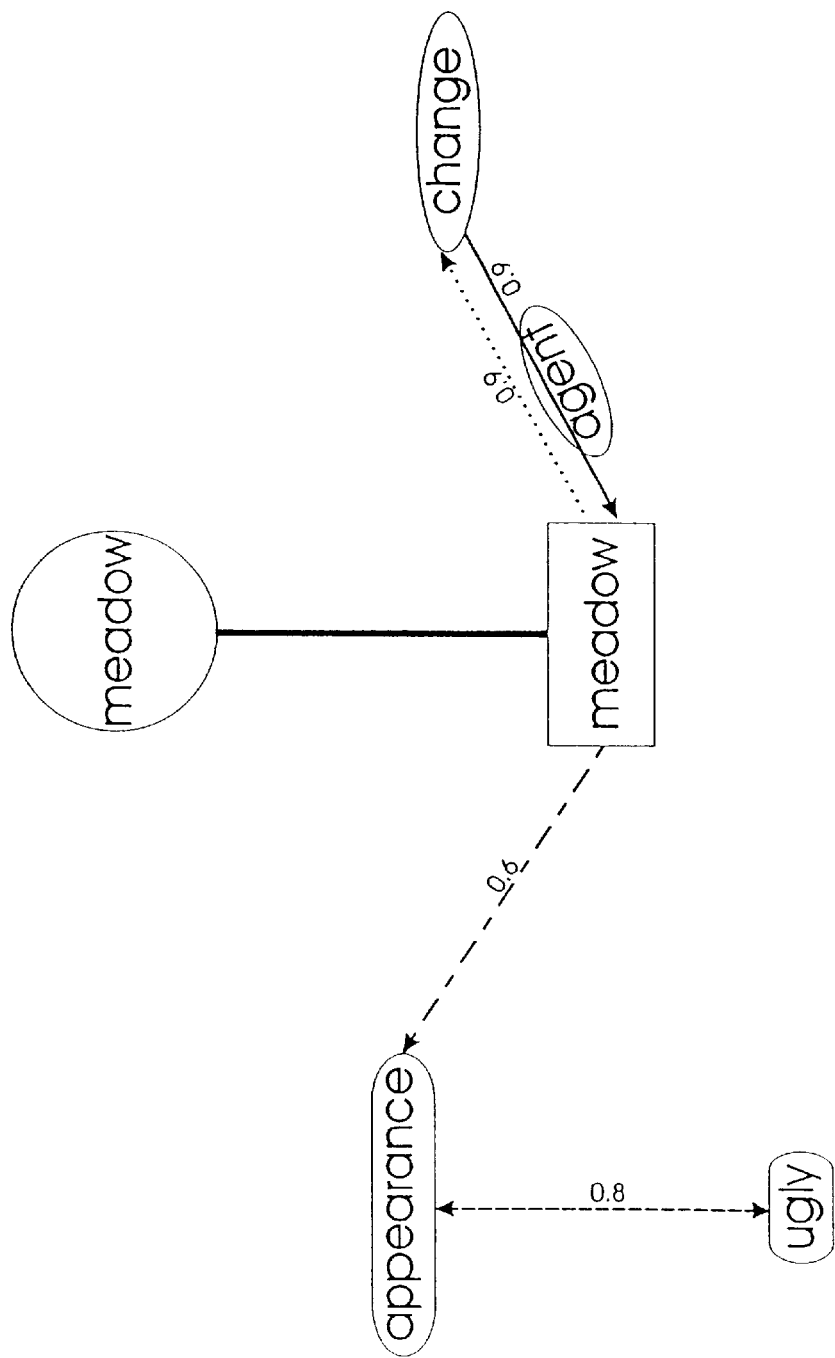
FIG. 9 illustrates inherited attributes and relations of 'meadow', in accordance with the present invention.

Second semantical unit: meadow $N = 2, n_1 = 2, n_2 = 1$ [There are two objects, i.e. N=2. There are two 'plants' in the knowledge database 11 (referred to as $plant_1$ and $plant_2$), i.e. $n_1$=2. The word 'meadow' appears only once, i.e. $n_2$=1. FIGS. 5, 7, and 9 show the inherited possible attributes and relations of both semantical units.]

Compute isolated fitness and potential (plant):

$f_1 = 1/sqrt(2) + 25\%$ rel. $= 0.7071 + 0.0732 = 0.7803$    [isolated fitness of $plant_1$ and $plant_2$. Plant implements possible attribute 'age']

$p_1 = sqrt(1/2) = 0.7071$    [isolated potential of $plant_1$ and $plant_2$.]

Compute isolated fitness and potential (meadow):

-continued

```
f₂ = 1/sqrt(1) + 0% rel. = 1.0                    [isolated fitness of meadow. No
                                                   implementations]
p₂ = sqrt(1/2) = 0.7071                           [isolated potential of meadow]
for propagation of potentials see FIGS. 6, 8, and 10
there are 3 local neighborhoods (subsets) and 2 combinations
combination 1 (plant₁ and meadow):
    no overlaps above t_min = 0.3                 [there is no relation between plant₁ and
                                                   meadow; the threshold t_min is 0.3  in
                                                   the present example]
    lfa₁ = 0                                      [no change in fitness]
    F₁ = 60% subj. fit. + 40% obj. fit. = 0.6 * 0.7803 + 0.4 * 1.0 = 0.8682
                                                  [fitness of combination 1]
combination 2 (plant₂ and meadow):
    l₂ = 3 (0.3 <= t <= 0.3531); l₂ = 2 (0.3531 <t <= 0.3620);
    l₂ = 1 (0.3620 <t <= 0.4414); l₂ = 0 (0.4414 <t <= 1.0)   [For overlaps see FIGS. 8 and
                                                              10]
    lfa₂ = max (...) = 0.7201
    f₁ = 0.7803 + 72.01% rel. = 0.7803 + 0.1582 = 0.9385      [improved fitness of plant₁]
    f₂ = 1.0 + 72.01% rel. = 1.0 + 0 = 1.0                    [improved fitness of meadow]
    F₂ = 60% subj. fit. + 40% obj. fit. = 0.6 * 0.9385 + 0.4 * 1.0 = 0.9631   [fitness of
                                                              combination 2]
```

Please note that the above three sentences (input string 12) are selected to show how the present invention deals with information which is ambiguous. Sentence I might either refer to an element in the database 11 that contains information about a living thing (plant$_2$ in FIG. 4), or it might refer to an element in the database 11 that contains information about a building (plant$_1$ in FIG. 4). The above algorithms are defined and optimized such that the inventive system can determine to which semantical units in the knowledge database 11 the segments or semantical units in the input string 12 are associated. The system 10 processes the first sentence I. Based on the above equations, the system 10 determines that it is more likely ($F_2>F_1$) that in this first sentence I plant refers to an element in the database 11 that contains information about a living thing (plant$_2$). This conclusion is mainly influenced by the fact that there is no association in the knowledge database 11 between the object 'meadow' and the object 'plant$_1$'.

Figure 6:
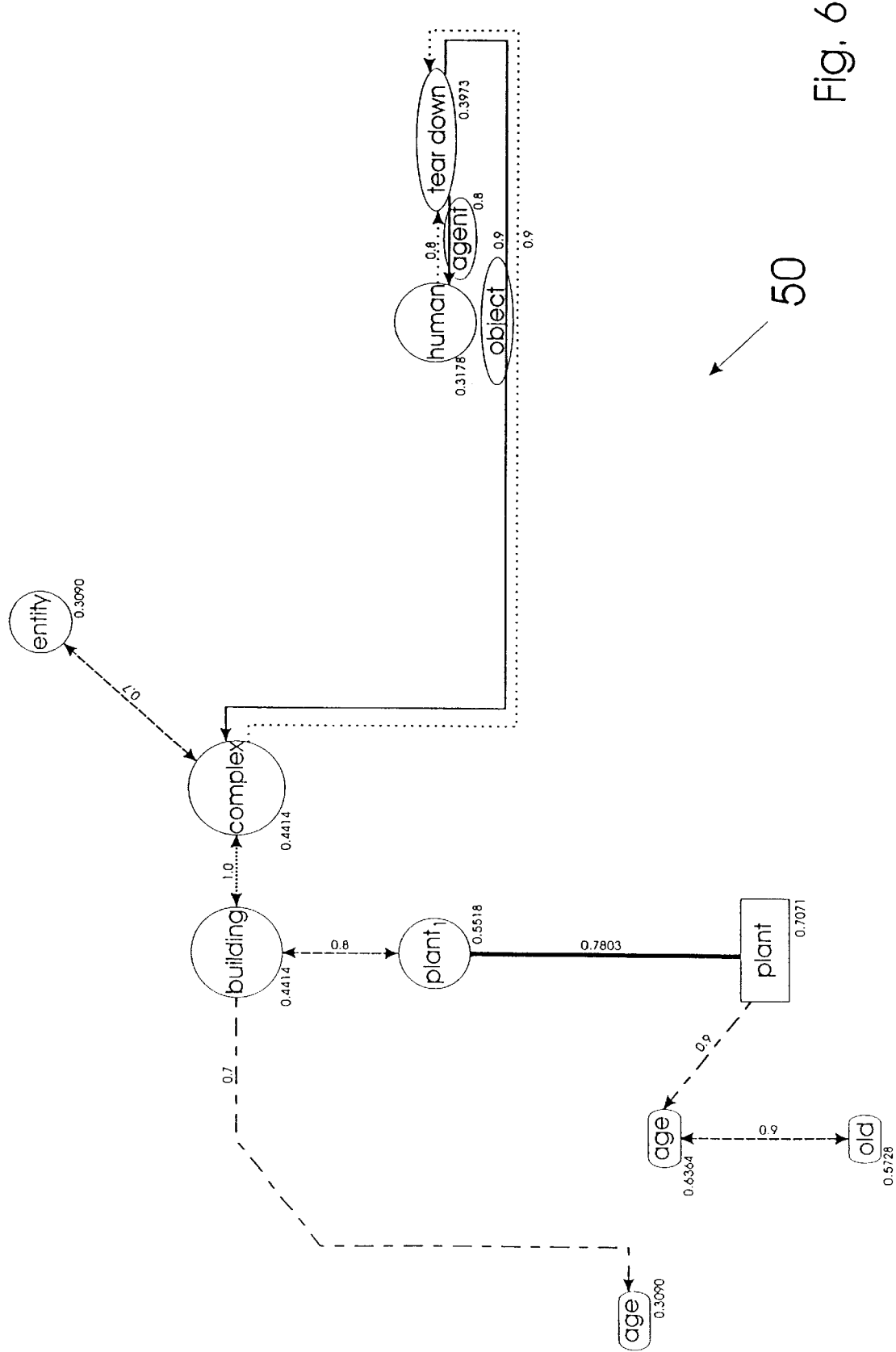
FIG. 6 illustrates a classification of and a local network around 'plant$_1$', in accordance with the present invention

The inventive system 10 identifies a subset (which later may become part of the augmented input network) for each segment or semantical unit in the input string 12. In the present example there are two subsets for the object 'plant'. The first subset 50 is shown in FIG. 6. Since the threshold $t_{min}$ is 0.3 in the present example, all semantical units outside the respective subset 50 are suppressed. The plant has an isolated fitness of $1/\sqrt{2}=0.7071$ since two plants (plant$_1$ and plant$_2$) were found in the knowledge database 11, while the meadow has an isolated fitness of $1/\sqrt{1}=1.0$ since only one meadow was found in the knowledge database 11. All possible attributes and connections associated with the object 'plant' are illustrated in FIG. 5. The words 'age' and 'old' are implemented attributes 2 of the object 'plant' and are shown as attributes in FIG. 6. Note that there are no connections 3 implemented in the first sentence of the present example. According to the present invention, a classification probability (adjusted isolated fitness) is calculated which gives an indication as to whether the plant in the input string 12 is likely to refer to the semantical unit plant$_1$ or plant$_2$ in the knowledge database 11.

In the present example, the classification probability is $1/\sqrt{2}$+bonus=0.7803. The bonus is added because the attribute 'age' with value 'old' is a possible attribute for both 'plant$_1$' and 'plant$_2$'. Next, the isolated potential of the object 'plant' is calculated to $\sqrt{1/2}=0.7071$, because there is one appearance of the object 'plant' and there are a total of two semantical units ('plant' and 'meadow') in the string up to the present sentence I. The potential of 'plant$_1$' is calculated by multiplying the classification probability and the isolated potential of 'plant'. The potential of 'plant$_1$' is 0.7803× 0.7071=0.5518, which is above the threshold of 0.3. The weight (semantical distance) assigned to the connection between 'plant$_1$' and 'building' is 0.8, in the present example. The potential of 'building' is calculated to 0.5518× 0.8=0.4414 which is also above the threshold of 0.3. The weight (semantical distance) assigned to the connection between 'building' and 'complex' is 1.0, in the present example, and the potential of 'complex' is calculated to: 0.4414×1.0=0.4414, which is above the threshold of 0.3. The weight (semantical distance) assigned to the connection between 'complex' and 'entity' is 0.7, in the present example, and the potential of 'entity' is calculated to: 0.4414×0.7=0.3090, which is above the threshold of 0.3. The potential of all other semantical units is below the threshold and these semantical units are thus deemed to be of no relevance. By means of the above calculations it was shown how the potential propagates through the network until a subset (part of an augmented input network) is identified. Note that the equations and algorithms can be modified.

Figure 8:
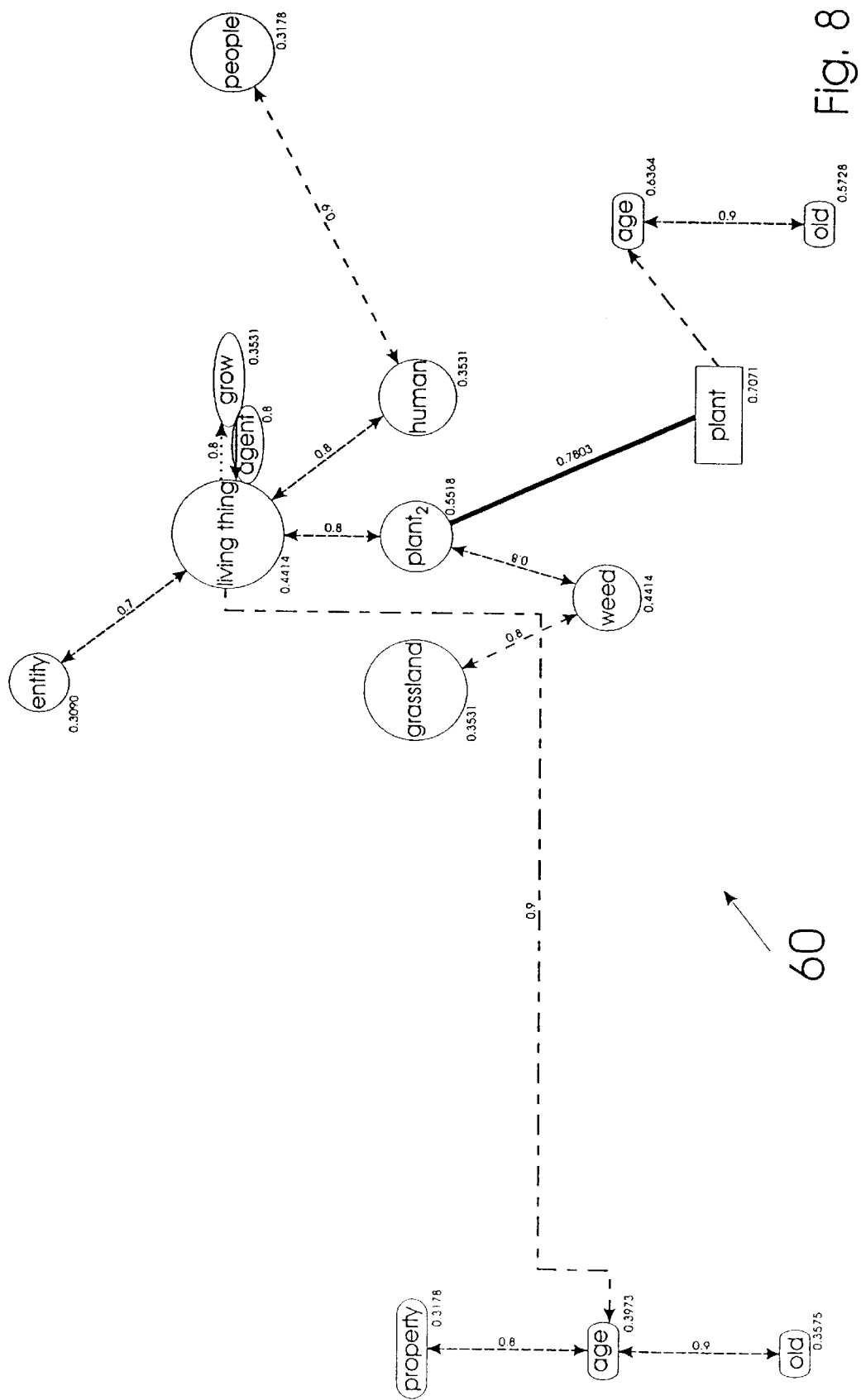
FIG. 8 illustrates a classification of and a local network around 'plant$_2$', in accordance with the present invention.

The subset 60 (part of an augmented input network) of plant$_2$ is illustrated in FIG. 8. This subset 60 is identified using the same approach as described in connection with FIG. 6.

If one now compares the subsets 50 and 60 illustrated in FIGS. 6 and 8, it is difficult to tell which one of the two possibilities is a better representation of the textual information conveyed in the input string 12.

Figure 10:
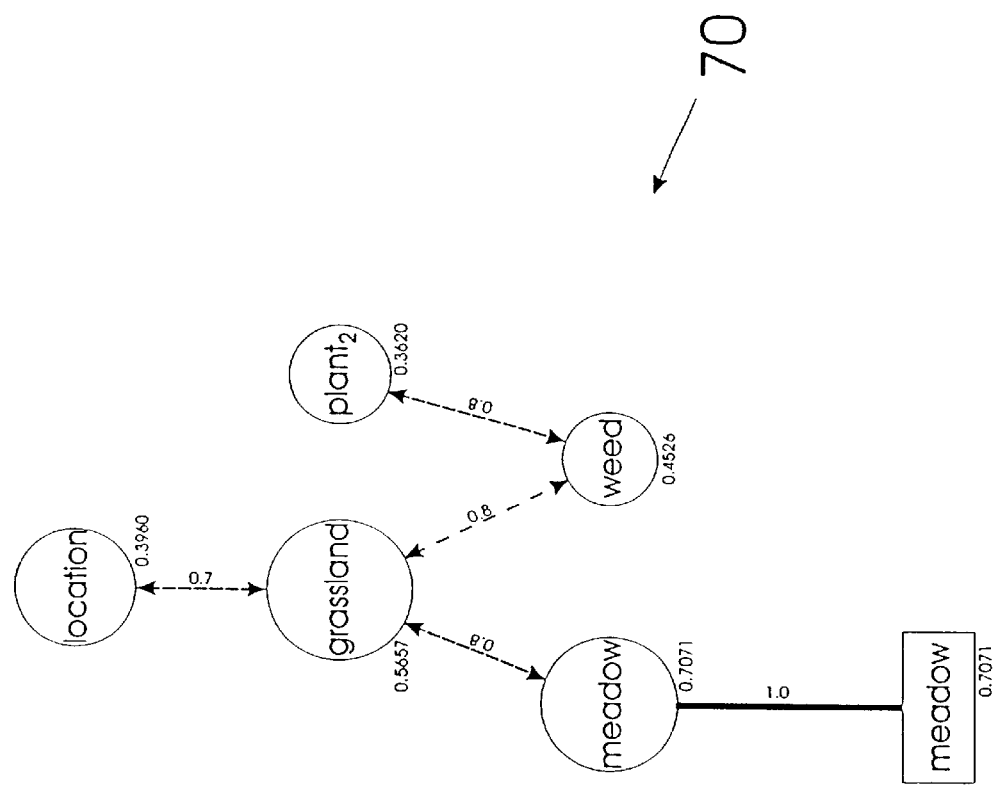
FIG. 10 illustrates a classification of and a local network around 'meadow', in accordance with the present invention.
Figure 11:
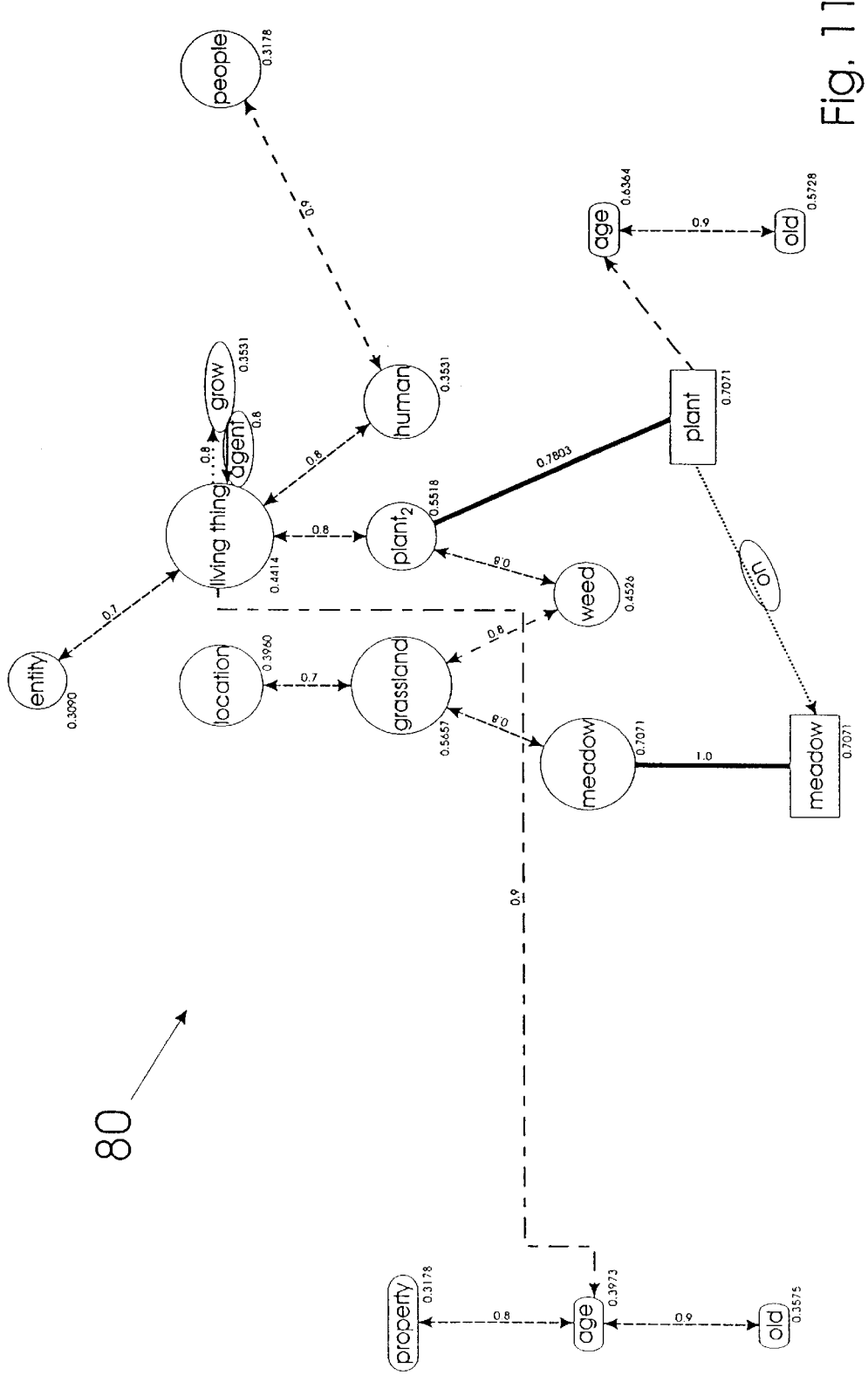
FIG. 11 illustrates a resulting semantical network of sentence 1, in accordance with the present invention

Finally, a third subset 70 is identified which corresponds to the second object 'meadow' in the input string 12. This subset 70 is illustrated in FIG. 10. The isolated potential of meadow is 0.7071. The classification probability of the object 'meadow' in the input network as the object 'meadow' in the knowledge database 11 is $1/\sqrt{1}=1.0$ since there is only one semantical unit 'meadow' in this database 11. This yields a potential of 'meadow' in the knowledge database 11 of 0.7071. The semantical distance between 'meadow' and 'grassland' is 0.8 in the present example, and the 'grassland's' potential is calculated to 0.7071×0.8= 0.5657. The semantical distance between 'grassland' and 'weed' is 0.8 in the present example, and the potential of 'weed' is calculated to be 0.5657×0.8=0.4526. The semantical distance between 'weed' and 'plant$_2$' is 0.8 in the present example, and the potential of 'plant$_2$' is calculated to 0.4526×0.8=0.3620, which is above the threshold. The semantical distance between 'grassland' and 'location' is 0.7 in the present example, and the potential of 'location' is calculated to 0.5657×0.7=0.3960, which is above the threshold.

According to the present example we now have three subsets 50, 60, and 70 for the two semantical units in the input string 12. In a next step these subsets 50, 60, and 70 are now combined to obtain an augmented input network 80. In order to ensure that this augmented input network 80 properly reflects what textual information was conveyed in the input string 12, the most likely combination of subsets 50, 60, and 70 has to be selected. There are different ways to do this. The approach described here starts with deriving all possible combinations of the subsets 60, 70, and 80. In the present example, these are the combinations "plant$_1$+meadow" (combination 1) and "plant$_2$+meadow" (combination 2), since all semantical units must appear exactly once in each combination. Then the overlaps in the subsets are determined for each combination. In combination 1 there is no overlap, while in combination 2 the semantical units "weed", "grassland", and "plant$_2$" have an overlap (i.e. they appear in the subsets of both "plant$_2$" and "meadow"). Therefore, the semantical units in combination 2 earn a bonus (local fitness adjustment) calculated from the formula $$lfa_2 = \max_{t_{min} \leq t \leq 1} \left\{ 1/2 + 1/\pi \, \text{ArcTan}\left(20t - 10 + 2\sqrt{\sum_{i=2}^{N} il_i/N}\right) \right\}.$$

If one observes that for $0.3=t_{min} \leq t \leq 0.3531$ we have $l_2(t)=3$, for $0.3531 < t \leq 0.3620$ we have $l_2(t)=2$, for $0.3620 < t \leq 0.4414$ we have $l_2(t)=1$, and for $0.4414 < t \leq 1.0$ we have $l_2(t)=0$, while $l_i(t)=0$ for all i>2, this formula yields lfa$_2$=0.7201, that is, the previous isolated fitnesses of meadow and plant$_2$ are increased by 72.01% relative to 1.0, thus yielding the respective values for "plant as plant$_2$" of 0.9385 and "meadow as meadow" of 1.0. Finally, the total fitness for each subset combination is calculated from the formula $F_1$ or $F_2$=(30% predicate fitness+30% subject fitness+20% object fitness+20% other). Since the percentages are relative to 100% and there is only one grammatical subject (plant) and one other object (meadow), this yields the modified formulas and values $F_1$=(60% plant as plant, fitness+40% meadow as meadow fitness)=60%×0.7803+40%×1.0=0.8682, and $F_2$=(60% plant as plant$_2$ fitness+40% meadow a meadow fitness)=60%×0.9385+40%×1.0=0.9631 for combinations 1 and 2, respectively. Since $F_2 > F_1$, the object "plant" is identified as "plant$_2$", the living thing. Note that here also the equations and algorithms can be modified.

If one now also processes the other two sentences II and III, the system gets additional information which either leads to a reconsideration of a prior combination, or to a refinement of a combination. Note that the second sentence II talks about weeds. For the system this furthers the supposition of sentence I that plant refers to plant$_2$ as a living thing rather than a building. After having processed the third sentence III, this picture has to be revised, because this sentence contains the connection object 3 'tearing it down'. This expression is never used in connection with living things in the object role (but only in the agent role). The third sentence thus seems to indicate that the first and second sentence should have referred to an element in the database 11 that contains information about a building rather than a living thing. With this new theme selection sentence I and II may be reprocessed. The combination of subsets is dynamically changed until all textual information conveyed by an input string 12 is processed. Due to this iterative approach it is possible to obtain an augmented input network 80 that gives the best possible representation of the information carried in the input string 12.

The second sentence does not add any information which helps to better understand the meaning of the first sentence, because weeds can grow next to a building or next to a living plant. Since weeds and living plants are somewhat related, at this point it seems more likely that the first sentence refers to a living plant. The third sentence finally contains information which helps the system to 'understand' the meaning of the first and second sentences. It is clear from the third sentence that in the other two sentences 'plant' refers to a building.

If we now suppose that the intended process was to act upon an element kept in the database system 10, and we also suppose that the index database 13 contains the semantical units plant$_1$, plant$_2$, and meadow, among others, and that the semantical units plant$_1$ and plant$_2$ have access pointers to elements E1 and E2 in the database, respectively, then after the first two sentences the system 10 would decide to act upon element E2 in the database, because the system 10 understood that in the input string 12 (up to the second sentence) 'plant' most likely refers to 'plant as a living thing', i.e. plant as plant$_2$. In other words, from the overlap of the most likely augmented input network (combination 2 in the above example) with the index database 13 the system finds that the local network in the index database 13 consists of at least the semantical unit plant$_2$, and because the access pointer of this semantical unit plant$_2$ points at element E2 in the database, it decides to act upon element E2 in the database. However, the system might also present element E1 with a lower ranking than element E2 to act upon.

After the third sentence the situation changes. The system 10 now understands that in the input string 12 'plant' most likely refers to 'plant as a building', i.e. plant as plant$_1$. In other words, from the overlap of the most likely augmented input network (now combination 1 in the above example) with the index database 13 the system finds that the local network in the index database 13 consists of at least the semantical unit plant$_1$, and because the access pointer of this semantical unit plant$_1$ points at element E1 in the database, it decides to act upon element E1 in the database. But again, the system 10 might also present element E2 with a lower ranking than element E1 to act upon. Proposed are schemes and systems based on a special model of textual information and natural language. According to our model, natural language as well as textual information consists of semantical units which are grouped at different levels of hierarchy and are all of a similar type. In addition, we use weights to express the semantical distance of two linked semantical units. Thus, the knowledge database, speech, and questions are all represented in what is herein called a fractal hierarchical network The augmented input network of an input string is created by locating its semantical units, possible connections, possible attributes, and possible roles in the knowledge database or in the index database and copying the semantical neighborhoods from the knowledge database 11 or from the index database 13, whereby overlapping areas are increased. Finally, the overlap of such a network with the index database 13 yields a local network in the index database 13 which can be used to allow a user or system to act upon an element within a database.

According to the present invention the world knowledge can be used when storing an element or file, i.e., no user generated keywords are required. The present scheme allows the usage of neighborhood matches in the search process. The present databases (such as the world knowledge and index database) are fractal-hierarchical networks. The world knowledge is not mapped to an underlying file structure. According to the present invention no file location information is required, in fact, all files could as well be stored in one single directory.

The present invention can also be used for data mining purposes. The inventive approach allows to extract meaning from the textual information conveyed in input strings and can process huge amounts of information. It can determine relationships and trends that were previously invisible or unclear. The inventive approach allows to automatically apprehend meaning of input strings of any length with a previously unmatched quality.

The present invention can be realized in hardware, software, or a combination of hardware and software. The database system according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

A computer program or computer program means in the present context mean any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method for adding an element to a database system having an index database, said method comprising:
   evaluating an input string describing said element to obtain an input network that includes a semantical unit representing said element;
   updating said index database, wherein said index database has a fractal hierarchical structure; and
   maintaining an existing access pointer or creating a new access pointer between said element and said semantical unit, thereby rendering said element in said database system accessible or retrievable.

2. The method of claim 1, wherein said updating of said index database comprises relating said semantical unit to a semantical unit of said index database.

3. The method of claim 1, wherein said updating of said index database comprises adding said semantical unit or said input network to said index database.

4. The method of claim 1, wherein said input network has a fractal hierarchical structure.

5. The method of claim 1, wherein said access pointer describes a physical or logical location where said element is stored in said database system.

6. The method of claim 1, wherein said element is added logically to said database system by updating said index database with said semantical unit.

7. The method of claim 1, wherein said element is a file and said database system is a file repository or file directory, or wherein said element is a database element and said database system is a database with multiple database elements, or wherein said element is a database and said database system is a database of databases.

8. The method of claim 4, wherein said semantical unit of said input network and said semantical unit of said index database are similar across hierarchies.

9. The method of claim 4, wherein said input string is automatically derived from a content of said element.

10. The method of claim 4, wherein said database system further comprises a knowledge database that has a fractal hierarchical structure and that is consulted in obtaining said input network.

11. The method of claim 10, wherein said input network comprises a semantical unit provided in said knowledge database or in said index database that is deemed to be related to said element.

12. A method for acting upon an element kept in a database system having an index database, said method comprising:
   receiving an input string describing said element;
   evaluating said input string to obtain an input network defining a local network within said index database to which said input string is deemed to be related such that said local network includes a semantical unit representing said element, wherein said index database has a fractal hierarchical structure;
   displaying said semantical unit to a user; and
   acting upon said element by using an access pointer that is associated with said semantical unit.

13. The method of claim 12, wherein said element is accessed, retrieved, opened, displayed, or read back by acting upon said element.

14. The method of claim 12, wherein said element is acted upon using a computer mouse, a key on a computer keyboard, or a combination of keys on a computer keyboard.

15. The method of claim 12, wherein said database system also includes a knowledge database that has a fractal hierarchical structure and that is consulted in obtaining said input network.

16. The method of claim 12, wherein said input string includes keywords.

17. The method of claim 12, wherein said input string is textual information.

18. The method of claim 17, wherein said database system also includes a knowledge database that has a fractal hierarchical structure, and wherein said textual information is evaluated by consulting said knowledge database.

19. The method of claim 12, wherein said local network is defined within said index database by taking into account said input network.

20. The method of claim 12, wherein said local network within said index database is defined so as to comprise semantical units representing elements that are in a logical neighborhood.

21. The method of claim 12, wherein said local network within said index database is defined such that associated semantical units are included.

22. A method for the generation of an index database when adding a first element to a database system, said method comprising:
   evaluating an input string describing said first element to obtain an input network that includes a semantical unit representing said first element;

creating said index database by identifying it with said input network, wherein said index database has a fractal hierarchical structure; and maintaining an existing access pointer or creating a new access pointer between said first element and said semantical unit, thereby rendering said first element in said database system accessible or retrievable.

23. The method of claim 22, wherein said input network has a fractal hierarchical structure.

24. The method of claim 22, wherein said access pointer describes a physical or logical location where said first element is stored in said database system.

25. The method of claim 22, wherein said first element is a file and said database system is a file repository or file directory, or wherein said first element is a database element and said database system is a database with multiple database elements, or wherein said first element is a database, and said database system is a database of databases.

26. A method for updating an index database for use in connection with a database system, said method comprising:

comparing a plurality of semantical units of said index database to (a) a plurality of semantical units in a knowledge database and (b) a plurality of neighborhoods in said knowledge database, wherein said index database and said knowledge database have a fractal hierarchical structure, wherein said plurality of semantical units in said knowledge data base are counterparts of said plurality of semantical units in said index database, and wherein said plurality of neighborhoods are neighborhoods of said counterparts;

updating said index database by adding a semantical unit from said knowledge database, or updating said index database by deleting a member of said plurality of said semantical units of said index database that does not refer to an element in said database system.

27. The method of claim 26, wherein said semantical unit from said knowledge database to be added to said index database appears in said neighborhood, but is not yet present in said index database.

28. The method of claim 27, wherein said neighborhood is determined by using a threshold and semantical distance function.

29. The method of claim 26, wherein said member of said plurality of semantical units to be deleted from said index database does not appear in said neighborhood, but is present in said index database.

30. A computer program product comprising:

a computer readable medium having computer program code thereon to make a database system that includes an index database that has a fractal hierarchical structure, and to execute a procedure to:

evaluate an input string describing an element that is to be added to said database system to obtain an input network that includes a semantical unit representing said element;

update said index database; and

Ad maintain an existing access pointer or create a new access pointer between said element and said semantical unit, thereby rendering said element in said database system accessible or retrievable.

31. A computer program element comprising:

computer program code to make a database system that includes an index database that has a fractal hierarchical structure, and to execute a procedure to:

evaluate an input string describing an element that is to be added to said database system to obtain an input network that includes a semantical unit representing said element;

update said index database; and maintain an existing access pointer or create a new access pointer between said element and said semantical unit, thereby rendering said element in said database system accessible or retrievable.

32. The computer program element of claim 31, wherein said index database includes a plurality of semantical units, and wherein said updating of said index database is done by relating said semantical unit of said input network to a member of said plurality of semantical units of said index database.

33. The computer program element of claim 31, wherein said updating of said index database is done by adding said semantical unit or said input network to said index database.

34. The computer program element of claim 31, wherein said access pointer describes a physical or logical location where said element is stored in said database system.

35. The computer program element of claim 31, wherein said input string is automatically derived from a content of said element.

36. The computer program element of claim 31, wherein said database system further includes a knowledge database that has a fractal hierarchical structure and that is consulted in obtaining said input network.

37. A computer program product comprising:

a computer readable medium having computer program code thereon to make a database system that includes an index database that has a fractal hierarchical structure, and to execute a procedure to:

receive an input string describing an element of said database system that is to be acted upon;

evaluate said input string to obtain an input network defining a local network within said index database to which said input string is deemed to be related such that said local network includes a semantical unit representing said element;

display said semantical unit to a user; and act upon said element by using an access pointer that is associated with said semantical unit.

38. A computer program element comprising:

computer program code to make a database system that includes an index database that has a fractal hierarchical structure, and to execute a procedure to:

receive an input string describing an element of said database system that is to be acted upon;

evaluate said input string to obtain an input network defining a local network within said index database to which said input string is deemed to be related such that said local network includes a semantical unit representing said element;

display said semantical unit to a user; and act upon said element by using an access pointer that is associated with said semantical unit.

39. The computer program element of claim 38, wherein said element is accessed, retrieved, opened, displayed, or read back by acting upon said element.

40. A computer program product for generation of an index database when a first element is to be added, for use in connection with a database system, said computer program product comprising:

a computer readable medium, having computer program code thereon to make said database system, and to execute a procedure to:

evaluate an input string describing said first element to obtain an input network that includes a semantical unit representing said first element;

create a fractal hierarchical index database by identifying said first element with said input network; and maintain an existing access pointer or create a new access pointer between said first element and said semantical unit, thereby rendering said first element in said database system accessible or retrievable.

41. A computer program element for generation of an index database when a first element is to be added, for use in connection with a database system, said computer program element comprising:

computer program code to make said database system and to execute a procedure to:

evaluate an input string describing said first element to obtain an input network that includes a semantical unit representing said first element;

create said index database by identifying said first element with said input network, wherein said index database has a fractal hierarchical structure; and maintain an existing access pointer or create a new access pointer between said first element and said semantical unit, thereby rendering said first element in said database system accessible or retrievable.

42. A computer program product for updating an index database for use in connection with a database system, said computer program product comprising:

a computer readable medium, having computer program code thereon to make said database system, and to execute a procedure to:

compare a plurality of semantical units of said index database to (a) a plurality of semantical units in a knowledge database and (b) a plurality of neighborhoods in said knowledge database, wherein said index database and said knowledge database have a fractal hierarchical structure, wherein said plurality of semantical units in said knowledge data base are counterparts of said plurality of semantical units in said index database, and wherein said plurality of neighborhoods are neighborhoods of said counterparts;

update said index database by adding a member of said plurality of semantical units from said knowledge database, or update said index database by deleting a member of said plurality of said semantical units of said index database that does not refer to an element in said database system.

43. A computer program element for updating an index database for use in connection with a database system, said computer program element comprising:

computer program code to make said database system and to execute a procedure to:

compare a plurality of semantical units of said index database to (a) a plurality of semantical units in a knowledge database and (b) a plurality of neighborhoods in said knowledge database, wherein said index database and said knowledge database have a fractal hierarchical structure, wherein said plurality of semantical units in said knowledge data base are counterparts of said plurality of semantical units in said index database, and wherein said plurality of neighborhoods are neighborhoods of said counterparts;

update said index database by adding a member of said plurality semantical units from said knowledge database, or update said index database by deleting a member of said plurality of said semantical units of said index database that does not refer to an element in said database system.

44. A database system comprising:

a fractal hierarchical index database, and a processing unit for:

evaluating an input string describing an element that is to be added to said database system to obtain an input network that includes a semantical unit representing said element;

updating said index database; and maintaining an existing access pointer or creating a new access pointer between said element and said semantical unit representing said element, thereby rendering said element in said database system accessible or retrievable.

45. A database system comprising:

a fractal hierarchical index database, and a processing unit for:

receiving an input string describing an element in said database system that is to be acted upon;

evaluating said input string to obtain an input network defining a local network within said index database to which said input string is deemed to be related such that said local network includes a semantical unit representing said element;

displaying said semantical unit to a user; and acting upon said element by using an access pointer that is associated with said semantical unit.

46. A database system comprising:

a processing unit for:

evaluating an input string describing a first element that is to be added to said database system to obtain an input network that includes a semantical unit representing said first element;

creating a fractal hierarchical index database by identifying said first element with said input network; and maintaining an existing access pointer or creating a new access pointer between said first element and said semantical unit, thereby rendering said first element in said database system accessible or retrievable.

47. A database system comprising:

a fractal hierarchical knowledge database;

a fractal hierarchical index database, wherein said index database includes a plurality of semantical units, and wherein said knowledge database includes a plurality of semantical units that are counterparts of said semantical units in said index database and a plurality of neighborhoods of said counterpart semantical units; and a processing unit for:

comparing said semantical units of said index database to said counterpart semantical units and said counterpart neighborhoods in said knowledge database;

updating said index database by adding a semantical unit from said knowledge database, or updating said index database by deleting a member of said plurality of semantical units of said index database that does not refer to an element in said database system.

* * * * *